US012645748B2

(12) United States Patent
McCann et al.

(10) Patent No.: US 12,645,748 B2
(45) Date of Patent: Jun. 2, 2026

(54) SYSTEMS AND METHODS FOR SEARCH APPLICATION DEVELOPMENT

(71) Applicant: SuSea, Inc., Palo Alto, CA (US)

(72) Inventors: Bryan McCann, Palo Alto, CA (US); Richard Socher, Palo Alto, CA (US)

(73) Assignee: SuSea, Inc., Palo Alto, CA (US)

( * ) Notice: Subject to any disclaimer, the term of this patent is extended or adjusted under 35 U.S.C. 154(b) by 0 days.

(21) Appl. No.: 18/623,765

(22) Filed: Apr. 1, 2024

(65) Prior Publication Data

US 2024/0248942 A1    Jul. 25, 2024

Related U.S. Application Data

(63) Continuation-in-part of application No. 17/981,102, filed on Nov. 4, 2022, now Pat. No. 12,079,290.

(60) Provisional application No. 63/493,022, filed on Mar. 30, 2023, provisional application No. 63/277,091, filed on Nov. 8, 2021.

(51) Int. Cl.
| | |
|---|---|
| *G06F 16/90* | (2019.01) |
| *G06F 8/38* | (2018.01) |
| *G06F 16/9538* | (2019.01) |

(52) U.S. Cl.
CPC ............ *G06F 16/9538* (2019.01); *G06F 8/38* (2013.01)

(58) Field of Classification Search
None
See application file for complete search history.

(56) References Cited

U.S. PATENT DOCUMENTS

| | | | |
|---|---|---|---|
| 8,271,429 | B2 | 9/2012 | Ghuneim |
| 8,762,371 | B1 | 6/2014 | Zhang |
| 2004/0068486 | A1 | 4/2004 | Chidlovskii |
| 2011/0191316 | A1* | 8/2011 | Lai ..................... G06F 16/9535 |
| | | | 707/706 |
| 2016/0092563 | A1 | 3/2016 | Luo |
| 2018/0349804 | A1 | 12/2018 | Lakshmanan et al. |
| 2019/0179861 | A1 | 6/2019 | Goldenstein et al. |

FOREIGN PATENT DOCUMENTS

| | | |
|---|---|---|
| CN | 1809803 A | 7/2006 |
| JP | H05314186 A | 11/1993 |
| JP | 2012528406 A | 11/2012 |
| JP | 2013537332 A | 9/2013 |

OTHER PUBLICATIONS

International Search Report and Written Opinion of PCT/US2022/ 079383 dated Jan. 31, 2023, 14 pages.
Baeza-Yates: "Semantic Query Understanding", SIRIP2: Start-Up Research Academic Collaboration, SIGIR'17, Aug. 7-11, 2017, Shinjuku, Tokyo, Japan, p. 1357, XP058368570.

(Continued)

*Primary Examiner* — Belix M Ortiz Ditren
(74) *Attorney, Agent, or Firm* — Wilson Sonsini. Goodrich & Rosati

(57) ABSTRACT

The present application generally relates to search engines, and more specifically to systems and methods for a customized search platform that generates and integrates search applications based on input from data sources or application providers.

18 Claims, 23 Drawing Sheets

(56) References Cited

OTHER PUBLICATIONS

Safhi et al., "Data Source Selection in Big Data Context", The 21st International Conference of Information Integration and Web-based Applications & Services (iiWAS2019) Dec. 2-4, 2019, Munich, Germany, ACM, New York, NY, 6 pages.
Chinese Office action for application 202280087864.4, dated Dec. 20, 2024, 5 pages.
Japanese Office Action for Application No. 2024-527195, dated Jul. 8, 2025, 3 pages.

* cited by examiner

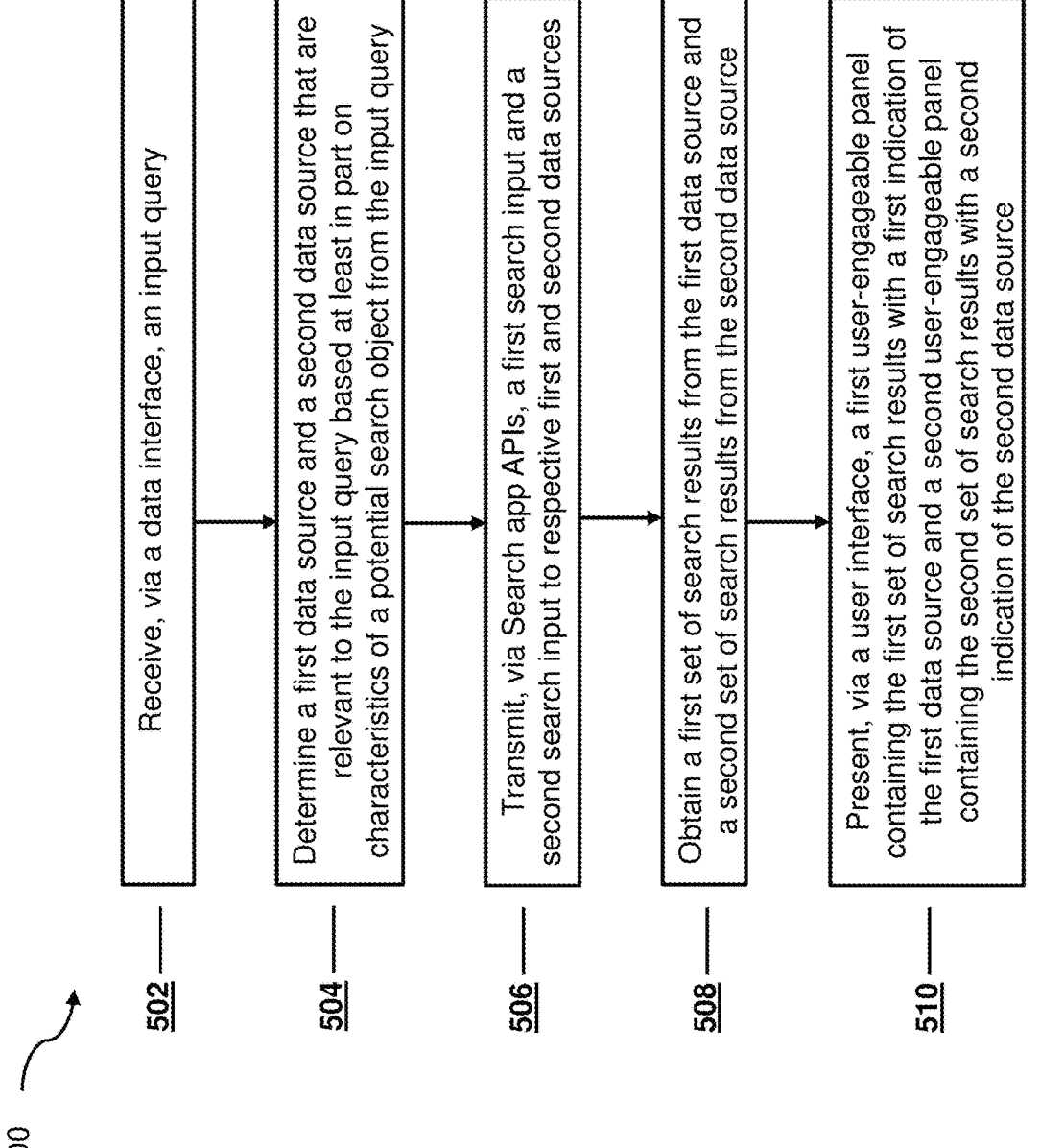

500

502 — Receive, via a data interface, an input query

504 — Determine a first data source and a second data source that are relevant to the input query based at least in part on characteristics of a potential search object from the input query 506 — Transmit, via Search app APIs, a first search input and a second search input to respective first and second data sources 508 — Obtain a first set of search results from the first data source and a second set of search results from the second data source 510 — Present, via a user interface, a first user-engageable panel containing the first set of search results with a first indication of the first data source and a second user-engageable panel containing the second set of search results with a second indication of the second data source

SYSTEMS AND METHODS FOR SEARCH APPLICATION DEVELOPMENT

CROSS REFERENCE(S)

The instant application is a nonprovisional of and claims priority under 35 U.S.C. 119 to U.S. provisional application 63/493,022, filed Mar. 30, 2023.

This instant application is a continuation-in-part of and claims priority under 35 U.S.C. 120 to U.S. non-provisional application Ser. No. 17/981,102, filed Nov. 4, 2022, which in turn claims priority under 35 U.S.C. 119 to U.S. provisional application No. 63/277,091, filed Nov. 8, 2021.

All of the above applications are expressly incorporated by reference herein in their entirety.

TECHNICAL FIELD

The present application generally relates to search engines, and more specifically to systems and methods for a customized search platform that generates and integrates search applications based on input from data sources or application providers.

BACKGROUND

Search engines allow a user to provide a search query and return search results in response. Search sites such as Google.com, Bing.com, and/or the like usually provide a list of search results to a user from all sorts of data sources. For example, these existing search engines usually crawl web data to collect search results that are relevant to a search query. However, a user has little control or transparency on how or where the search engines conduct their search.

Additionally, data owners of the data sources accessed by the search system may have a preferred way of being presented to users. However, current search system allows little controllability for the data owner of the data source, also referred to as search partners, on how search results are presented to a user.

BRIEF DESCRIPTION OF THE DRAWINGS

FIG. 5 is an example logic flow diagram illustrating a method of search based on the framework shown in FIGS. 1-4A, according to some embodiments described herein.

Figure 1:
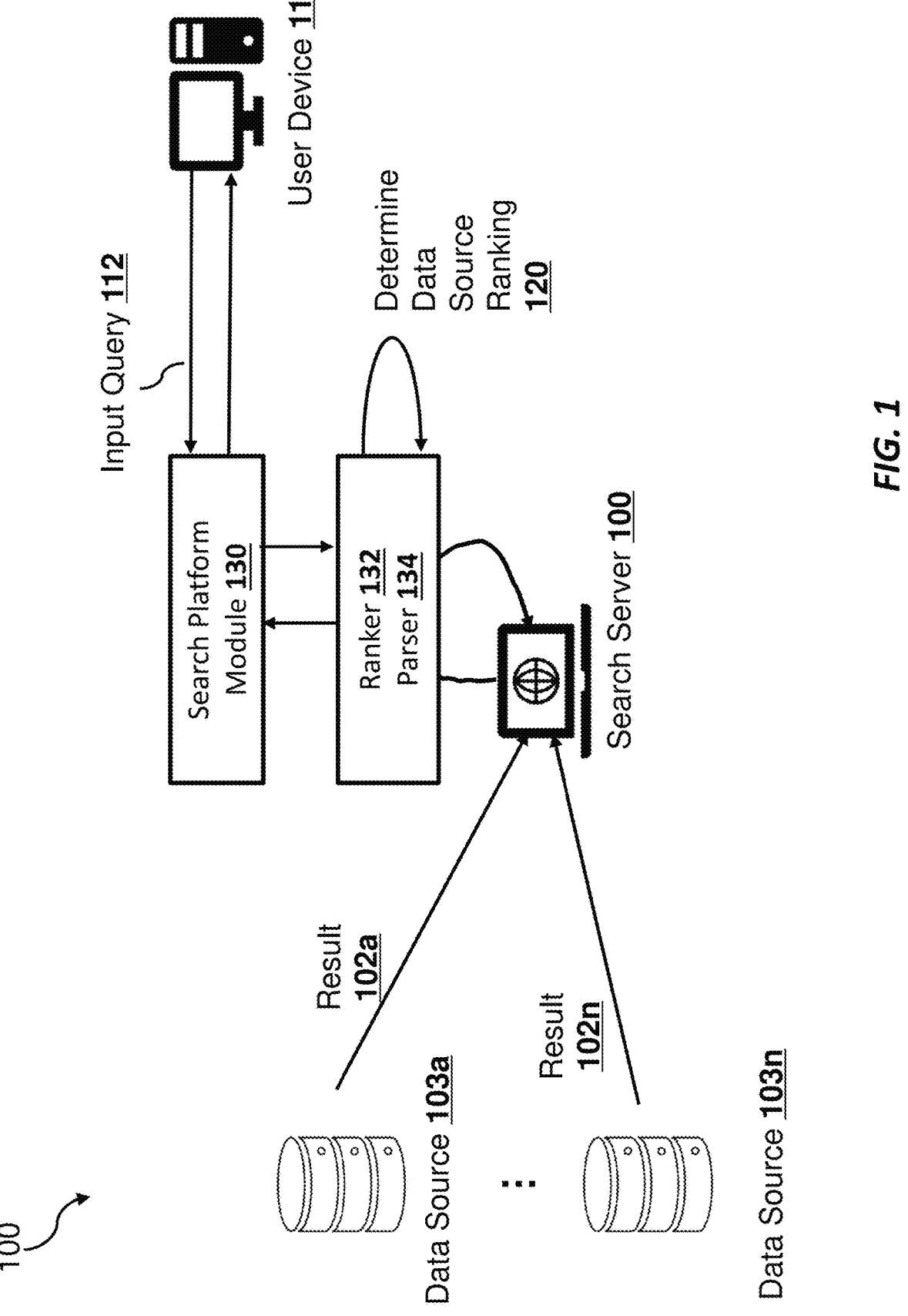
FIG. 1 is a simplified diagram illustrating a data flow between entities during a search, according to one embodiment described herein.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

The present application generally relates to search engines, and more specifically to systems and methods for a customized search platform.

Search engines allow a user to provide a search query and return search results in response. Search sites such as Google.com, Bing.com, and/or the like usually adopts a centralized structure that provides a list of search results to a user from all sorts of data sources. For example, these existing search engines usually crawl web data to collect search results that are relevant to a search query. However, a user has little control or transparency on how or where the search engines conduct their search. In addition, a user has little control on how their personal or private information is collected or used by generic search engines. For example, users may often want to engage with dedicated databases for specific searches. For example, human resource staff may use background check websites to search for potential new hires. For another example, legal professionals may search a juris database such as LexisNexis for case law. However, these dedicated databases are often scattered and difficult for a layperson to use, e.g., requiring a certain level of professional knowledge to enter the most effective search strings.

For example, when a user searches for "U.S. Pat. No. 12,345,678," a search engine such as Google or Bing may likely provide a list of search results such as Internet articles that mention the "U.S. Pat. No. 12,345,678." If the user is indeed looking for the actual patent document for "U.S. Pat. No. 12,345,678," preferably from an authorized data source such as the U.S. patent office database, going through all the search results can be cumbersome and inefficient for the user. User search experience is thus unsatisfactory in this type of search service.

In view of the need for improved user search experience, embodiments described herein provide systems and methods for a customized search platform. Specifically, the search system includes a web-based or mobile application platform that provides customized search experience for an individual user to have control over searches conducted at user preferred data sources. In one embodiment, the search system may, in response to a search query, determine one or more prioritized data sources based on the characteristics of the search query. For example, if the search query relates to a person's name such as "Richard Socher," data sources such as social media (e.g., Facebook, LinkedIn, Twitter, etc.), news media (e.g., Silicon Valley press, etc.), and/or the like, may be prioritized. For another example, if the search query relates to an abstract item such as "QRNN," common knowledge data sources (e.g., Wikipedia, etc.), academic data sources (e.g., arXiv, Stanford course materials, etc.), discussion sources (e.g., Quora, Reddit, etc.) may be prioritized.

In addition, a user may select or deselect data sources for his or her own searches, and the search platform may conduct a search query submitted by the user only at, or at least prioritize data sources that the user is interested in, and/or exclude data sources the user has disapproved.

In one embodiment, a user may actively select data sources he or she is interested in via a user account management page with the search platform. For example, the user may actively select Wikipedia, Reddit, Arxiv.org, and/or the like, to be the preferred data sources. As a result, if the user search for "QRNN," search results grouped per user selected data sources, e.g., Wikipedia, Reddit, Arxiv.org, may be presented to the user via a search user interface. The user can click on the icon of a data source, e.g., Reddit, and see a list of search results such as discussion threads relating to "QRNN" that are provided specifically from the data source "Reddit." For another example, if the user clicks on the icon of "Wikipedia," the Wikipedia page for "QRNN" may be provided.

In another embodiment, the search system may monitor user preference during user interaction with search results. For example, if the user actively elects "dislike" a displayed search result from a particular data source, or rarely interacts with search results from a particular data source, the search system may deprioritize search results from this particular data source. In the above example, if the user chooses to dislike or unselect search results from the data source "Reddit," the Reddit icon may be removed from the user interface presenting search results.

In another embodiment, the search system may provide customized display of search results for a particular data source as desired by the data source owner. For example, a data source owner may have specific interests in how information from the data source is displayed to Internet users when a search is performed. For instance, a social media site may want search results to be displayed in a format having widgets such as a "like" button, a "reply" button within a search panel (e.g., see FIG. 8C), such that Internet users can directly like, reply, or otherwise interact with social media posts within a search display panel, without having to be re-directed to the social media website from the current search browser. For another instance, a shopping site may want search results to be displayed within a search panel having a format of a product image as the background, with a brief description of the product overlaying the product image (e.g., FIG. 8I). The search system may provide a tool to facilitate a data source owner (such as users working for the data source) to control and edit the format that search results from the particular data source are displayed.

In this way, the search server provides a user-controllable and transparent Internet search experience for individual users. Specifically, by focusing on prioritized data sources based on characteristics of the search query itself, the search server presents Internet users with selected results from most relevant (prioritized) data sources, alleviating the burden for Internet users having to review and evaluate hundreds of search result links in a traditional search system. Search complexity and efficiency is also improved at the search server by focusing on prioritized data sources only, instead of massively searching through all available indexed webpages as a traditional search system.

In addition, by further prioritizing and filtering data sources per user preferences, the search server allows an Internet user to control where to search. Both search efficiency at the search server, and user efficiency at obtaining the most relevant and desired search results are improved. Therefore, computer technology in Internet search is improved.

In addition, on the other hand, the search server further allows data sources to have control over how the search results from the respective data sources are displayed within an Internet search system to achieve their respective brand values. Therefore, computer technology in Internet search is improved.

Overview

FIG. 1 is a simplified diagram illustrating a data flow between entities implementing the processes described in FIGS. 2-7, according to one embodiment described herein. A user interacts with user device 110, which in turn interacts with a search server 100 through input queries 112 provided by the user. Computing device 100 interacts with various data sources 103*a-n* (collectively referred to as 103). For example, the data sources 103*a-n* may be any number of available databases, webpages, servers, blogs, content providers, cloud servers, and/or the like. As described in further detail below with reference to FIGS. 5-6, search server 100 utilizes a parser 134 and ranker 132 to identify data sources 103 relevant to the input query 112, obtains search results from data sources 103, ranks 120 the search results, and presents the search results to the user via user device 110 to display sets of search results in user-engageable elements.

Common data sources 103*a-n* may include Wikipedia, Reddit, Twitter, Instagram (and/or social media), and/or the like. However, for different input queries 112, the search system may intelligently recommend what kind of data sources 103 may be most relevant to the specific search query. For example, when a user types in a search for "Quasi convolutional neural network," the search system may preliminarily determine (or categorize via a classifier) that the search term relates to a technical topic. Therefore, suitable data sources 103 may be identified as a knowledge base such as "Wikipedia," a discussion forum on which users may discuss technical topics such as "Reddit," an archive of scientific manuscript such as "arXiv" and/or the like may most likely be relevant or interesting to the user based on the input query 112. The search system may then recommend these data sources 103 to the user.

In a different example, if the user performs a search with the input query 112 "Richard Socher," which the search system may categorize it as the name of a person, the search system may rank the proposed data sources to include data sources 103 that are more relevant to people, such as "Instagram," "LinkedIn," "Google Scholar," and/or the like.

In another embodiment, as described in further detail below with reference to FIG. 7, the user can interact with the search results via user device 110 through user-engageable elements. In this way, the computing device 100 can refine search results to better tailor results to a user's desires and preferences by allowing a user to customize their preferred data sources 103. A user may choose to submit whether they prefer or do not prefer a particular data source by clicking on a "thumbs up" or "thumbs down" icon. Based on user submitted preferences, the search system may re-arrange and re-prioritize data sources. For example, if the user has elected "thumbs up" for "LinkedIn" but "thumbs down" for "Instagram," when the user searches for a person's name such as "Richard Socher," The search system may prioritize data sources such as LinkedIn but may de-prioritize data source such as "Instagram."

In one embodiment, the search server 100 may provide a programmable application development toolkit for the data source server 103a-n, e.g., a blog server, a social media platform, etc., to customize its own preferred search format. For example, a data source "Reddit" may configure its own preferred search format to be displayed as a panel within the search website (e.g., see FIG. 8B). The data source "Reddit" may configure display format parameter such as a title in bold fonts displayed on top of a segment of the detailed post as each search item. For another example, a data source "Twitter" may configure its own preferred search format to be displayed as a sliding panel having the user profile on the left-most block, and a series of scrolling blocks showing the Twitter user's most recent Tweets, each displaying a "like" icon, a "reply" icon, and a "comment" icon (e.g., see FIG. 8C).

Such display format configuration may be configured by the data source within the programmable application development toolkit. The programmable application development toolkit may further provide the ability to see real time updates or changes as they would appear to an end user.

In some embodiments, a data source server 103a-n may build an application for integration within the search system by their developers submitting and editing source code, e.g., in a programming language, or a customized programming language designed for integration within the search server 100. The search server 100 may then manipulate the information provided from the data source 103a-n to generate and build a front-end application for use within the search server 100. In some embodiments, the front-end application will be compiled into a different programming language such as python. The search server 100 may then incorporate the front-end application in search results and present the information to users when searches are performed.

For example, the built search application may be an application tile (e.g., the "reddit" tile in FIG. 8B) or series of application tiles that a user may scroll through to view various results. In other embodiments, the application may be a side panel (e.g., side panel in FIG. 8A) that provides interactive capabilities for users based on input search queries and corresponding results from the search system. In various embodiments, the application may incorporate and utilize elements such as buttons, forms, images, text, and other data collected and displayed via interfacing with an API.

In one embodiment, the created search application for each data source 103a-n allows developers' external data to be shown in the application. For instance, the search application may interface with an API for a data source to incorporate specific data or other functionality into the application. After a data source has created a search application, the search system can implement the search application within the search app store. Search users may then add the customized search application to the search platform (e.g., see FIG. 8H), so that search performed by users may include results from the data source that take advantage of the customized search application for that data source. In some embodiments, the customized search application will interface with the APIs of the data source, to further provide integration with the data source.

In an additional embodiment, a data source developer or end user may provide input to the search system to build a customized or individualized search server. A user may provide input related to desired graphical user interface ("GUI") elements, desired layout, desired content, a desired URL, or other information related to the display and appearance of the individualized search system.

Additionally, the user may provide input on desired search applications, desired search elements, and other inputs related to how searches are performed. For instance, a user may desire a customized search platform directed to sports results. Accordingly, the user may specify specific sports-related data sources, or may provide a categorical input of sports and the search system may select sports-related data sources to implement in the customized search system. Alternatively, the user may desire a customized search platform directed to news. Accordingly, the user may specify specific news websites, newspapers, and blogs as the desired data sources, or may select a categorical desire for news-related data sources and the search system may select news-related data sources to implement in the customized search system. Alternatively, a data source may seek to build a customized or individualized search system implementing search applications that are generated as described above. One or more search applications may be created and implemented directly into a customized search system.

Given the input, the search system may then generate a customized and individualized search platform. The search system will generate the appearance of the individualized search platform based on the user input. The customized search system will utilize the data sources either specifically indicated by the user prior to creation, or categorically generated based on the user input. The frequency and position of the results and data sources will be impacted based on the initial user input.

Accordingly, when a search is performed in the individualized search platform, only the specified data sources will be utilized by the search system using the methods described above. Thus, the search will be performed in the manner instructed by the user that created the individualized search platform, including both the appearance and data sources specified by the user. The user can then share the individualized search platform with other users, who can use the individualized search platform based on the configuration of the user that provided the initial input for creation.

Computer and Networked Environment

Figure 2:
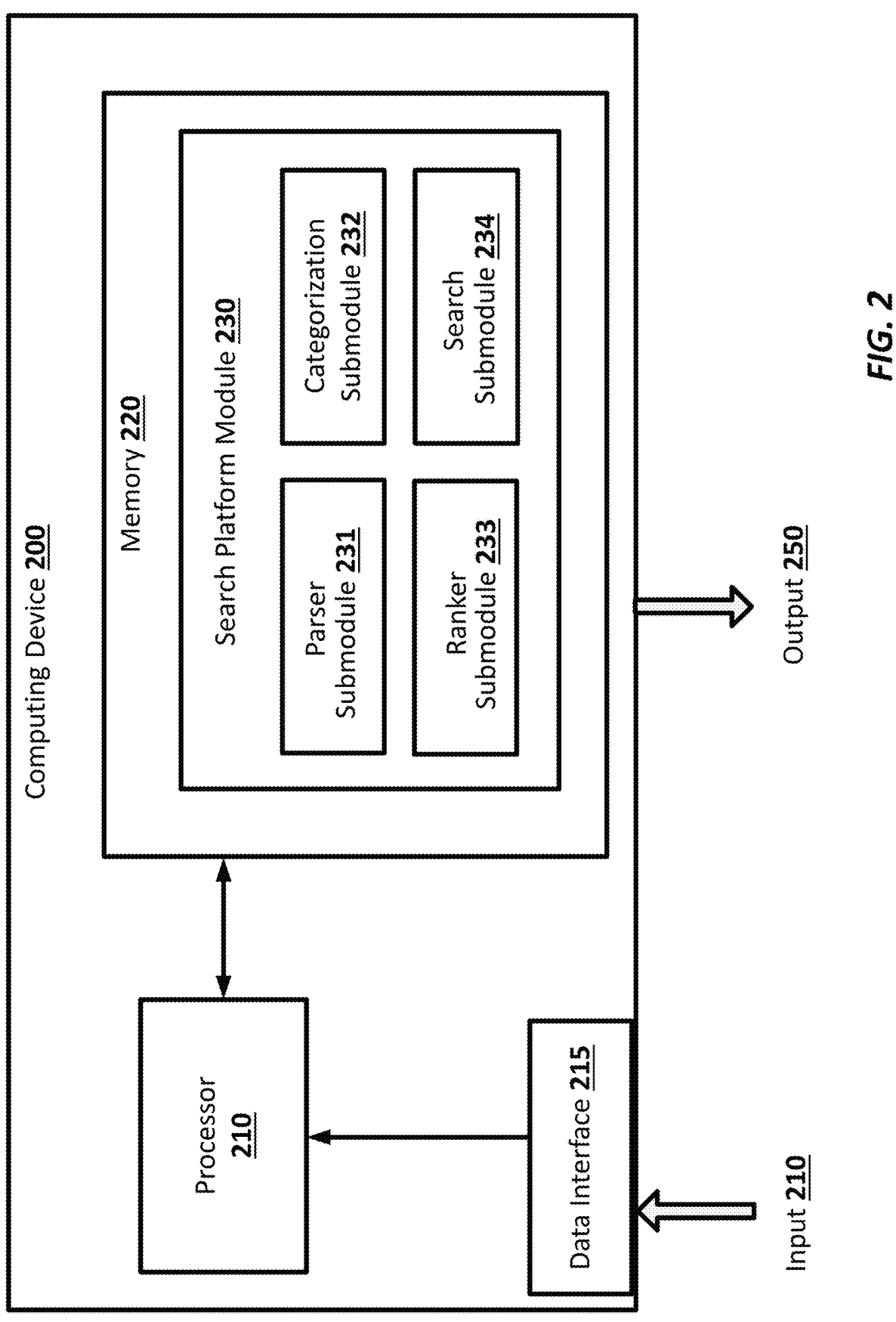
FIG. 2 is a simplified diagram illustrating a computing device implementing the search described in FIG. 1, according to one embodiment described herein.

FIG. 2 is a simplified diagram illustrating a computing device 200 implementing the customized search server 100 described in FIG. 1, according to one embodiment described herein. As shown in FIG. 2, computing device 200 includes a processor 210 coupled to memory 220. Operation of computing device 100 is controlled by processor 210. And although computing device 200 is shown with only one processor 210, it is understood that processor 210 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 200.

Computing device 200 may be implemented as a stand-alone subsystem, as a board added to a computing device, and/or as a virtual machine. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 200 in a manner as follows.

Memory 220 may be used to store software executed by computing device 200 and/or one or more data structures used during operation of computing device 200. Memory 220 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 210 and/or memory 220 may be arranged in any suitable physical arrangement. In some embodiments, processor 210 and/or memory 220 may be implemented on a same board, in a same package (e.g., system-in-package), on a same chip (e.g., system-on-chip), and/or the like. In some embodiments, processor 210 and/or memory 220 may include distributed, virtualized, and/or containerized computing resources. Consistent with such embodiments, processor 210 and/or memory 220 may be located in one or more data centers and/or cloud computing facilities.

In some examples, memory 220 may include non-transitory, tangible, machine readable media that includes executable code that when run by one or more processors (e.g., processor 210) may cause the one or more processors to perform the methods described in further detail herein. For example, as shown, memory 220 includes instructions for search platform module 230 that may be used to implement and/or emulate the systems and models, and/or to implement any of the methods described further herein. A search platform module 230 may receive input 240 such as an input search query (e.g., a word, sentence, or other input provided by a user to perform a search) via the data interface 215 and generate an output 250 which may be one or more user-engageable elements presenting the search results according to different data sources. For instance, if input data including a name, such as "Richard Socher," is provided, output data may include user-engageable elements showing results from "Twitter," "Facebook," "Instagram," "TikTok," or other social media websites. If input data including a food, such as "pumpkin pie," is provided, output data may include user-engageable elements showing results from "All Recipes," "Food Network," or other food-related websites. If input data related to coding, such as an error in python, is provided, output data may include user-engageable elements showing results from "StackOverflow," "Reddit," or other webpages or blogs oriented towards coding assistance.

The data interface 215 may comprise a communication interface, a user interface (such as a voice input interface, a graphical user interface, and/or the like). For example, the computing device 200 may receive the input 240 (such as a search query) from a networked database via a communication interface. Or the computing device 200 may receive the input 240, such as search queries, from a user via the user interface.

In some embodiments, the search platform module 230 is configured to parse inputs, categorize the inputs, and rank results. The search platform module 230 may further include a parser submodule 231, a categorization submodule 232, a ranker submodule 233 (e.g., similar to ranker 412 and parser 414 in FIG. 4A), and a search submodule 234. In one embodiment, the search platform module 230 and its submodules 231-234 may be implemented by hardware, software and/or a combination thereof.

In some embodiments, the search system adopts a search platform module 230 to generate and filter search results from all different data sources. For example, the search platform may include a ranker 233 and a parser 231 as shown in FIGS. 1-4A, to ingest user query, user contextual information, and other contextual information to coordinate which data sources are relevant, which corresponding data source application programming interfaces (APIs) should be contacted, how to parse the user query for each Search APP API, and ultimately the final ranked order of the data source results.

Some examples of computing devices, such as computing device 200 may include non-transitory, tangible, machine readable media that include executable code that when run by one or more processors (e.g., processor 210) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 3:
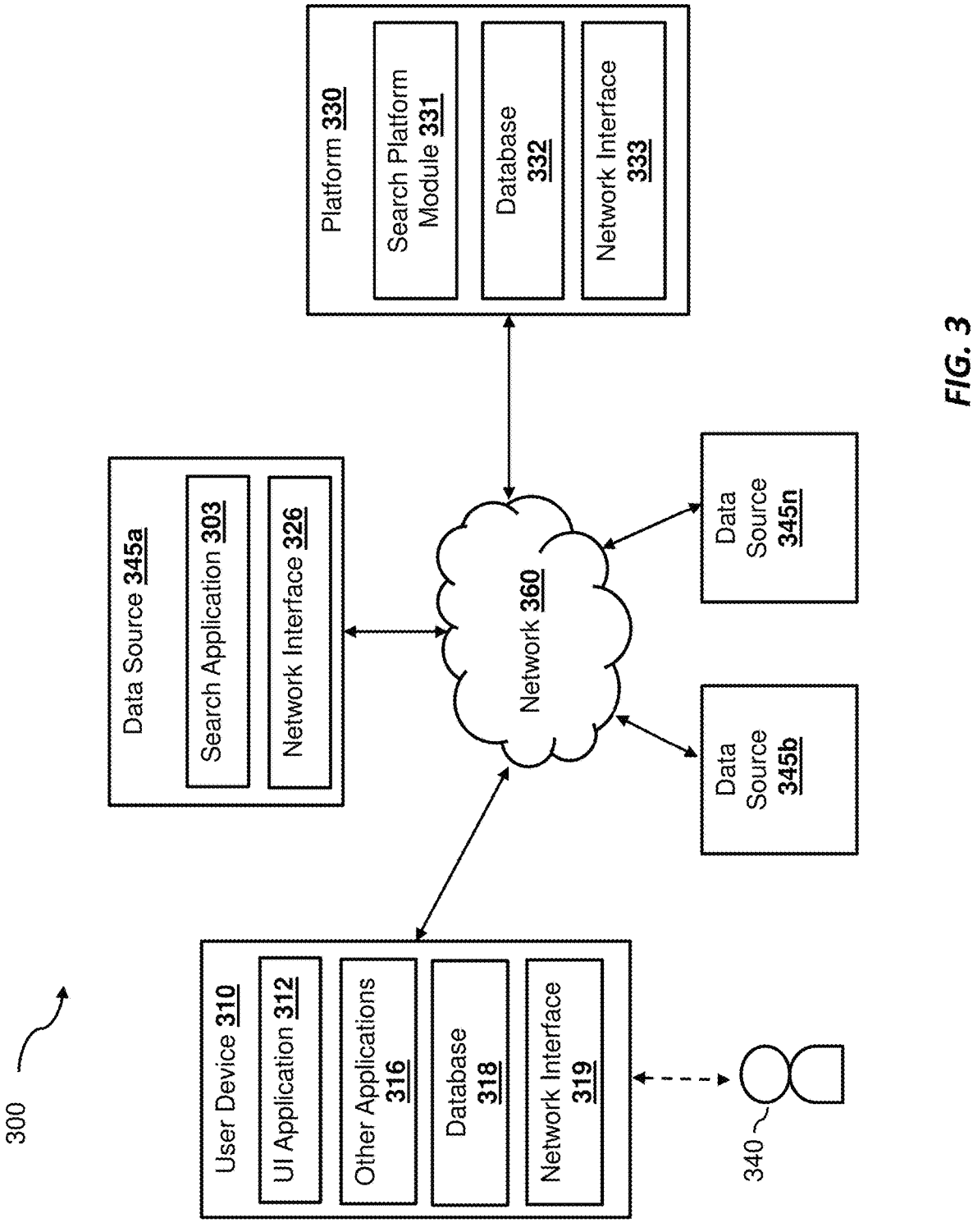
FIG. 3 is a simplified block diagram of a networked system suitable for implementing the search framework described in FIGS. 1-2 and other embodiments described herein.
Figure 6:
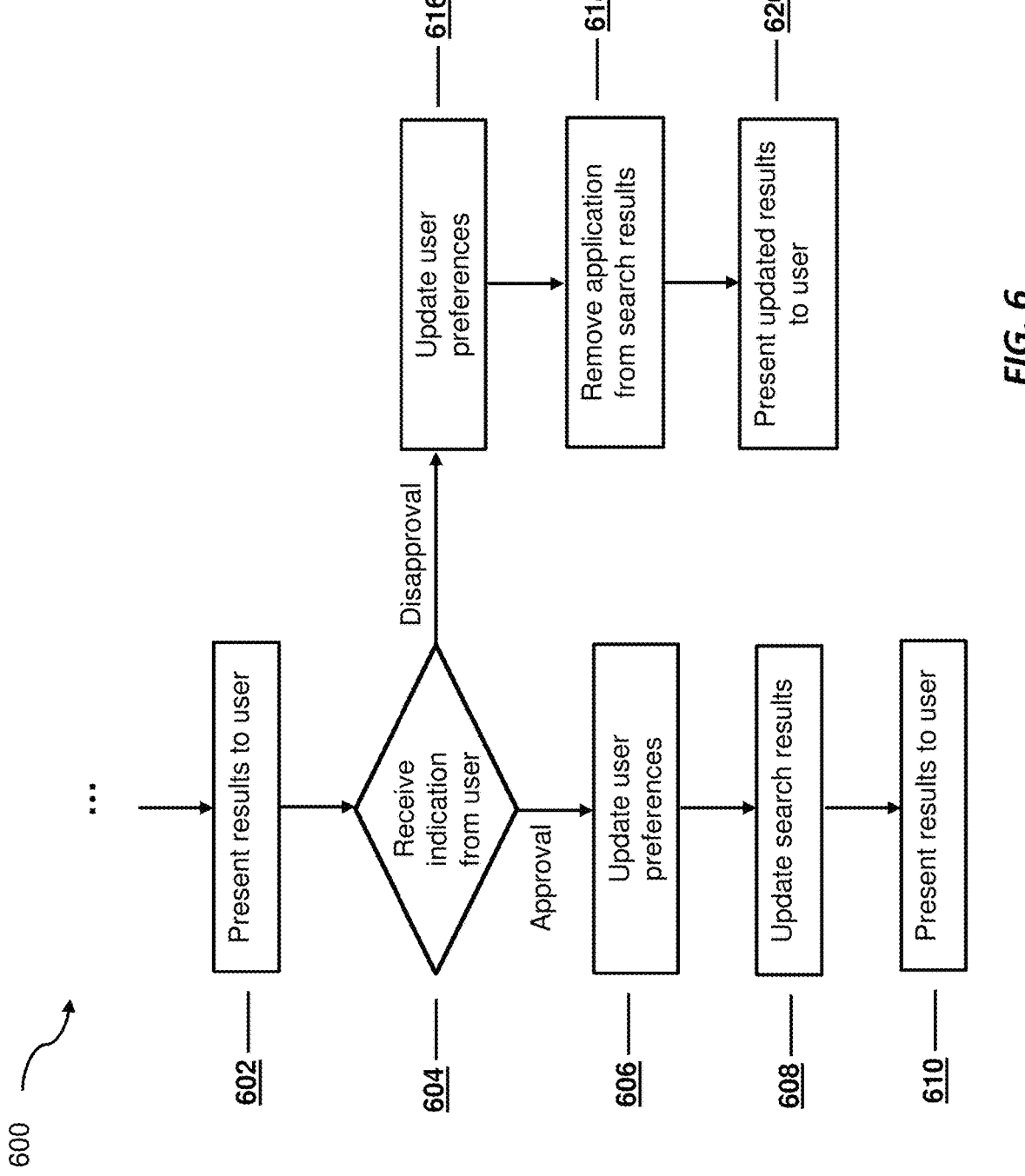
FIG. 6 is an example logic flow diagram illustrating a method of customized search based on the framework shown in FIGS. 1-4A, according to some embodiments described herein.

FIG. 3 is a simplified block diagram of a networked system suitable for implementing the customized search platform framework described in FIGS. 5-6 and other embodiments described herein. In one embodiment, block diagram 300 shows a system including the user device 310 which may be operated by user 340, data sources 345a and 354b-345n, platform 330, and other forms of devices, servers, and/or software components that operate to perform various methodologies in accordance with the described embodiments. Exemplary devices and servers may include device, stand-alone, and enterprise-class servers which may be similar to the computing device 200 described in FIG. 2, operating an OS such as a MICROSOFT® OS, a UNIX® OS, a LINUX® OS, or other suitable device and/or server-based OS. It can be appreciated that the devices and/or servers illustrated in FIG. 3 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 310, data sources 345a and 354b-345n, and the platform 330 may communicate with each other over a network 360. User device 310 may be utilized by a user 340 (e.g., a driver, a system admin, etc.) to access the various features available for user device 310, which may include processes and/or applications associated with the server 330 to receive an output data anomaly report.

User device 310, data sources 345a and 354b-345n, and the platform 330 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 300, and/or accessible over network 360.

User device 310 may be implemented as a communication device that may utilize appropriate hardware and software configured for wired and/or wireless communication with data source 345 and/or the platform 330. For example, in one embodiment, user device 310 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 310 of FIG. 3 contains a user interface (UI) application 312, and/or other applications 316, which may correspond to executable processes, procedures, and/or applications with associated hardware. For example, the user device 310 may receive search results in the form of user-engageable elements from the platform 330 and display the message via the UI application 312. In other embodiments, user device 310 may include additional or different modules having specialized hardware and/or software as required.

In various embodiments, user device 310 includes other applications 316 as may be desired in particular embodiments to provide features to user device 310. For example, other applications 316 may include security applications for implementing client-side security features, programmatic client applications for interfacing with appropriate APIs over network 360, or other types of applications. Other applications 316 may also include communication applications, such as email, texting, voice, social networking, and IM applications that allow a user to send and receive emails, calls, texts, and other notifications through network 360. For example, the other application 316 may be an email or instant messaging application that receives a prediction result message from the server 330. Other applications 316 may include device interfaces and other display modules that may receive input and/or output information. For example, other applications 316 may contain software programs for asset management, executable by a processor, including a graphical user interface (GUI) configured to provide an interface to the user 340 to view and interact with user-engageable elements displaying search results.

User device 310 may further include database 318 stored in a transitory and/or non-transitory memory of user device 310, which may store various applications and data and be utilized during execution of various modules of user device 310. Database 318 may store user profile relating to the user 340, predictions previously viewed or saved by the user 340, historical data received from the server 330, and/or the like. In some embodiments, database 318 may be local to user device 310. However, in other embodiments, database 318 may be external to user device 310 and accessible by user device 310, including cloud storage systems and/or databases that are accessible over network 360.

User device 310 includes at least one network interface component 319 adapted to communicate with data sources 345a and 354b-345n and/or the server 330. In various embodiments, network interface component 319 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data sources 345a and 354b-345n may correspond to a server that hosts one or more of the search applications 303a-n (or collectively referred to as 303) to provide search results including webpages, posts, or other online content hosted by data sources 345a and 354b-345n to the server 330. The search application 303 may be implemented by one or more relational database, distributed databases, cloud databases, and/or the like. Search application 303 may be configured by platform 330, by data source 345, or by some other party.

In some embodiments, data source servers 345a-n may receive a programmable search interface development toolkit from server 330 to build a preferred search application such that search results from the respective data source may be displayed to a search user using a preferred format, such as a brand specific style, and/or the like.

In one embodiment, the platform 330 may allow various data sources 345a and 354b-345n to partner with the platform 330 as a new data source. The search system provides an Application programming interface (API) for each data sources 345a and 354b-345n to plug into the service the search system. For example, the California Bar Association may register with the search system as a data source. In this way, the data source "California Bar Association" may appear amongst the available data source list on the search system. A user may select or deselect California Bar Association as a preferred data source for their search. In similar manners, additional data sources 345 may partner with the platform 330 to provide additional data sources for the search such that the user can understand where the search results are gathered.

The data source 345a-n (collectively referred to as 345) includes at least one network interface component 326 adapted to communicate with user device 310 and/or the server 330. In various embodiments, network interface component 326 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data source 345 may send asset information from the search application 303, via the network interface 326, to the server 330.

The platform 330 may be housed with the search platform module 230 and its submodules described in FIG. 2. In some implementations, platform 330 may receive data from search application 303 and/or network interface 326 at the data source 345 via the network 360 to generate user-engageable elements displaying search results. The generated user-engageable elements may also be sent to the user device 310 for review by the user 340 via the network 360.

The database 332 may be stored in a transitory and/or non-transitory memory of the server 330. In one implementation, the database 332 may store data obtained from the data vendor server 345. In one implementation, the database 332 may store parameters of the search platform model 230. In one implementation, the database 3232 may store user input queries, user profile information, search application information, search API information, or other information related to a search being performed or a search previously performed.

In some embodiments, database 332 may be local to the platform 330. However, in other embodiments, database 332 may be external to the platform 330 and accessible by the platform 330, including cloud storage systems and/or databases that are accessible over network 360.

The platform 330 includes at least one network interface component 333 adapted to communicate with user device 310 and/or data sources 345a and 354b-345n over network 360. In various embodiments, network interface component 333 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 360 may be implemented as a single network or a combination of multiple networks. For example, in various embodiments, network 360 may include the Internet or one or more intranets, landline networks, wireless networks, and/or other appropriate types of networks. Thus, network 360 may correspond to small scale communication networks, such as a private or local area network, or a larger scale network, such as a wide area network or the Internet, accessible by the various components of system 300.

Example Architecture

Figure 4A:
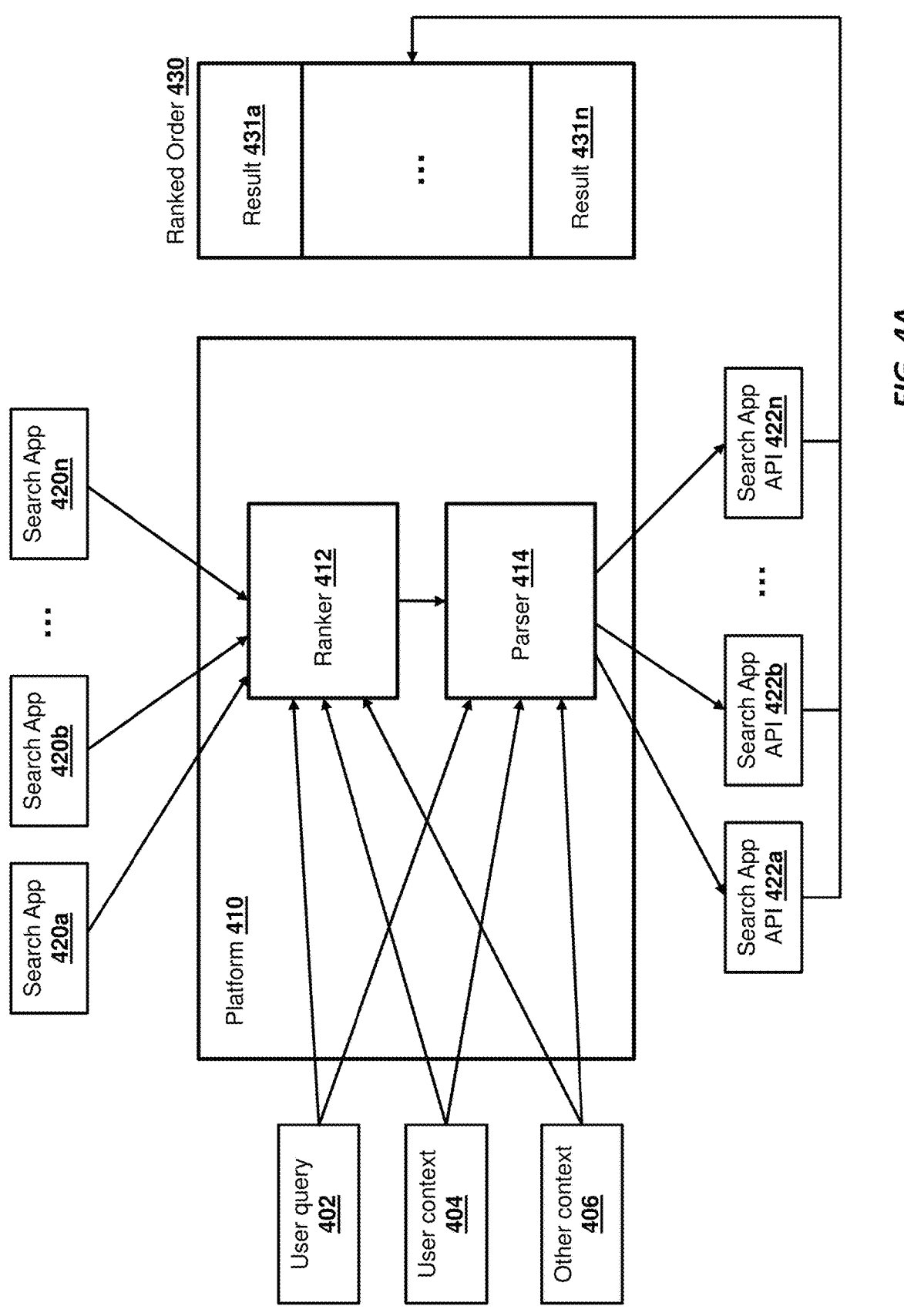
FIG. 4A is a simplified block diagram of a networked system suitable for implementing the customized search platform framework described in FIGS. 1-3 and other embodiments described herein.

FIG. 4A is a simplified block diagram of a networked system suitable for implementing the customized search platform framework described in FIGS. 1-3 and other embodiments described herein.

Platform 410 (which is similar to 230 in FIG. 2 or 330 in FIG. 3) receives input data from a user. This input data may include one or more of a user query 402, user context 404, and other context 406. User query 402 may include a word, multiple words, a sentence, or any other type of search query provided by a user performing a search using platform 410. For example, the user query 402 may be a search term such as "quasi recurrent neural network," "Richard Socher," etc. User context 404 may include inputs representative of the user, including a user ID, user preferences, user click logs, or other information collected or provided by the user, user selected preferred data sources, user past activities "like" or "dislike" a search result or a search source, and/or the like. Other context 406 may include inputs representative of other useful input information, including information about world events, searches that have been conducted around the same time, searches that have been conducted around the same area, searches that increased in volume over a period of time, or other potential contextual information that may assist platform 410 in providing appropriate search results to the user.

User query 402 may be converted, via platform 410, to a representative string $q=(q_1, \ldots, q_r)$ where each q is a single token in the string tokenized by some tokenization strategy. User context 404 and other context 406 may similarly be converted, via platform 410, to representative strings $u=(u_1, \ldots, u_m)$ (e.g., user context 404) and $c=(c_1, \ldots, c_p)$ (e.g., other context 406). A permutation of these inputs are concatenated into a single input sentence, e.g., the combined input sequence s=[TASK, q, SEP, u, SEP, c]. This combined input sequence is the entirety of representative string q, followed by representative string u, followed by representative string c, with special reserved tokens (TASK and SEP) used to inform the system of where one sequence ends and another begins.

The single input sentence is then provided to parser 414 (e.g., similar to parser submodule 231 in FIG. 2) and ranker 412 (e.g., similar to ranker submodule 233 in FIG. 2). Each of the ranker 412 and the parser 414 may be built on a neural network.

Specifically, ranker 414 determines and ranks a list of search apps 420-420n to conduct the search. In some embodiments, each search applications 420a-420n corresponds to a particular data sources 103a-n in FIG. 1, or one of 345a-345n, as shown in FIG. 3. For example, search app 420a corresponds to a search application that is configured to search within the database of Amazon.com; search app 420b corresponds to a search application that is configured to search within the database of Facebook.com, and/or the like. Ranker 414 uses the input sequence including user query 402, user context 404, and other context 406 to score the plurality of search apps 420a-420n, by running the input sequence through a neural network model once for each search app 420a-420n, as described in further detail below with respect to FIG. 4B. In this way, ranker 414 ranks a list of search apps corresponding to a list of data sources to conduct the user query 402. For example, for a user query 402 search for "affordable instant pot", search app 420a corresponding to Amazon.com may be prioritized over search app 420b corresponding to Facebook.com.

After the ranker 412 determines and ranks a list of search apps 420a-n for a particular user query 402, the parser 414 determines a respective specific search input for each search app API 422a-n that corresponds to each search apps 420a-n, respectively. Parser 414 may use the input sequence including user query 402, user context 404, and other context 406 to determine which tokens in a user query correspond to which inputs of search app APIs 422a-422n, as described further below with respect to FIG. 4C.

For example, Ranker 412 utilizes the combined input sequence s for each search application 420a-420n, where s is additionally concatenated with a representation of the search application 420 such that $s_{a_i}=[s, \text{search application } 420i]$.

Both ranker 412 and parser 414 make use of a variant of Transformer, where a sequence containing n tokens is embedded as a sequence of n vectors in $\mathbb{R}^d$. Each vector is the sum of a learned token embedding and a sinusoidal positional embedding. The sequence of vectors is stacked into a matrix $X_0 \in \mathbb{R}^{n \times d}$ and processed by l attention layers. The ith layer consists of two blocks, each preserving model dimension d. The first block uses multi-head attention with k heads.

$$\text{Attention}(X, Y, Z) = \text{softmax}\left(\frac{\text{mask}(XY^T)}{\sqrt{d}}\right)Z$$

$$\text{MultiHead}(X, k) = [h_1; \ldots ; h_k]W_O$$

$$\text{where } h_j = \text{Attention}(XW_j^1, XW_j^2, XW_j^3)$$

The second block uses a feedforward network with ReLU activation that projects inputs to an inner dimension f. This operation is parameterized by $U \in \mathbb{R}^{f \times d}$ and $V \in \mathbb{R}^{f \times d}$:

$$FF(X) = \max(0, XU)V$$

Each block precedes core functionality with layer normalization and follows it with a residual connection. Together, they yield $X_{i+1}$:

$$\text{Block 1: } \overline{X} = LayerNorm(X_i)$$
$$H_i = MultiHead(\overline{X}_i) + \overline{X}_i$$
$$\text{Block 2: } \overline{H}_i = LayerNorm(H_i)$$
$$X_{i+1} = FF(\overline{H}_i) + \overline{H}_i$$

The final output of the Transformer for a single input sequence x is then $X_l$. For example, the ranker 412 may pass an output matrix after l layers of attentions, which represents ranking information of the search apps 420a-n, to the parser 414. The parser 414 may output the matrix $X_l$ comprising search inputs for the search apps 420a-n, which are sent to the search app APIs 422a-n, respectively.

The returned search results via the search app APIs 422a-422n are then sorted according to the ranking generated by the ranker 412 and presented in ranked order 430. For example, result 431a corresponds to a group of search results from highest ranked search app 420a, and result 431n corresponds to search results from the lowest ranked search apps 420n. The results 431a-431n are then presented to the user via a graphical user interface or some other type of user output device. For example, search results 431a-431n may grouped and presented in the form of a list of user-engageable elements, each displaying an icon representing each respective search app (data source). Upon user selection of the icon, a list of search results from the respective search app may be presented to the user. Example UI diagrams can be found in FIGS. 8A-8K.

Therefore, by employing a neural-network based ranker 412 and parser 414, the search platform may intelligently predict which data sources are likely to be prioritized for a particular user based on the user query 402 and user context 404. For example, a user may directly configure a preference or dislike of a data source (e.g., see FIG. 8H, 8J). The search platform may thus include or exclude search apps corresponding to the preferred or disliked data sources in the search (e.g., as filtered by the ranker 412) accordingly. For another example, when a user dislikes a search post from Twitter.com, the search platform may not exclude Twitter.com from future search. However, if the user constantly dislikes search results from Twitter.com (e.g., more than a pre-defined times per day, per week, per percentage of total searches, etc.), the search platform may more likely deprioritize or exclude Twitter.com from future search. The neural model of the ranker 412 may be trained predict whether Twitter.com should be excluded or de-prioritized based on past user behaviors.

For example, the ranker 412 and the parser 414 may each be trained individually. A training input may comprise similar data such as the user query 402, user context 404 and other context 406. The ranker 412 is to generate a training output of a ranking of search apps (data sources), which are compared with the actual ground-truth ranking paired with the training input. A cross-entropy loss may be computed to update the ranker 412 via backpropagation. The parser 414 may be trained in a similar manner. For another example, the ranker 412 and the parser 414 may be trained jointly end-to-end.

These embodiments describe a system and method for a customized search platform that provides users control and transparency in their searches. In some instances, a user may prefer complete privacy when it comes to their searches and/or internet browsing. In such instances, a user may opt to remain in a "private mode" during searching. In other instances, a user may prefer results that are tailored to the user's preferences or interests. In such instances, a user may opt to instead enter a "personal mode."

A user may opt to remain in a "private mode" during searching. In "private mode," the computer system does not store queries on its servers, record clicks or any other interactions with the search engine, and disables all apps that require IP address or location, in order to protect user privacy. In a "private mode" embodiment, a user is able to perform searches with control over how the search engine collects and uses information about the user. Thus, in a "private mode" embodiment, platform 410 may collect input from a user query 402 and other context 406, but may not have access to user context 404 in performing each search. In addition, user query 402 will not be retained by platform 410 beyond the need to perform an immediate search using the user query 402.

In "personal mode," a user can instead further customize their experience during searching to retain control of the searching while enjoying results tailored specifically to the user. A user can optionally create a user profile to retain and store preferences. In a "personal mode" embodiment, a user is able to control their own search experience through information they provide to the search system. For instance, a user can select preferred data sources, and can modify the order in which applications appear in response to a search query. User interactions may optionally be collected and used to provide better tailored results for the user in the future, but "personal mode" ensures that the user retains control of their search experience instead of SEO professionals or advertisers. Thus, in a "personal mode" embodiment, platform 410 may collect input including user query 402, user context 404, and other context 406. The user context 404 collected and utilized may be controlled by the user.

Figure 4B:
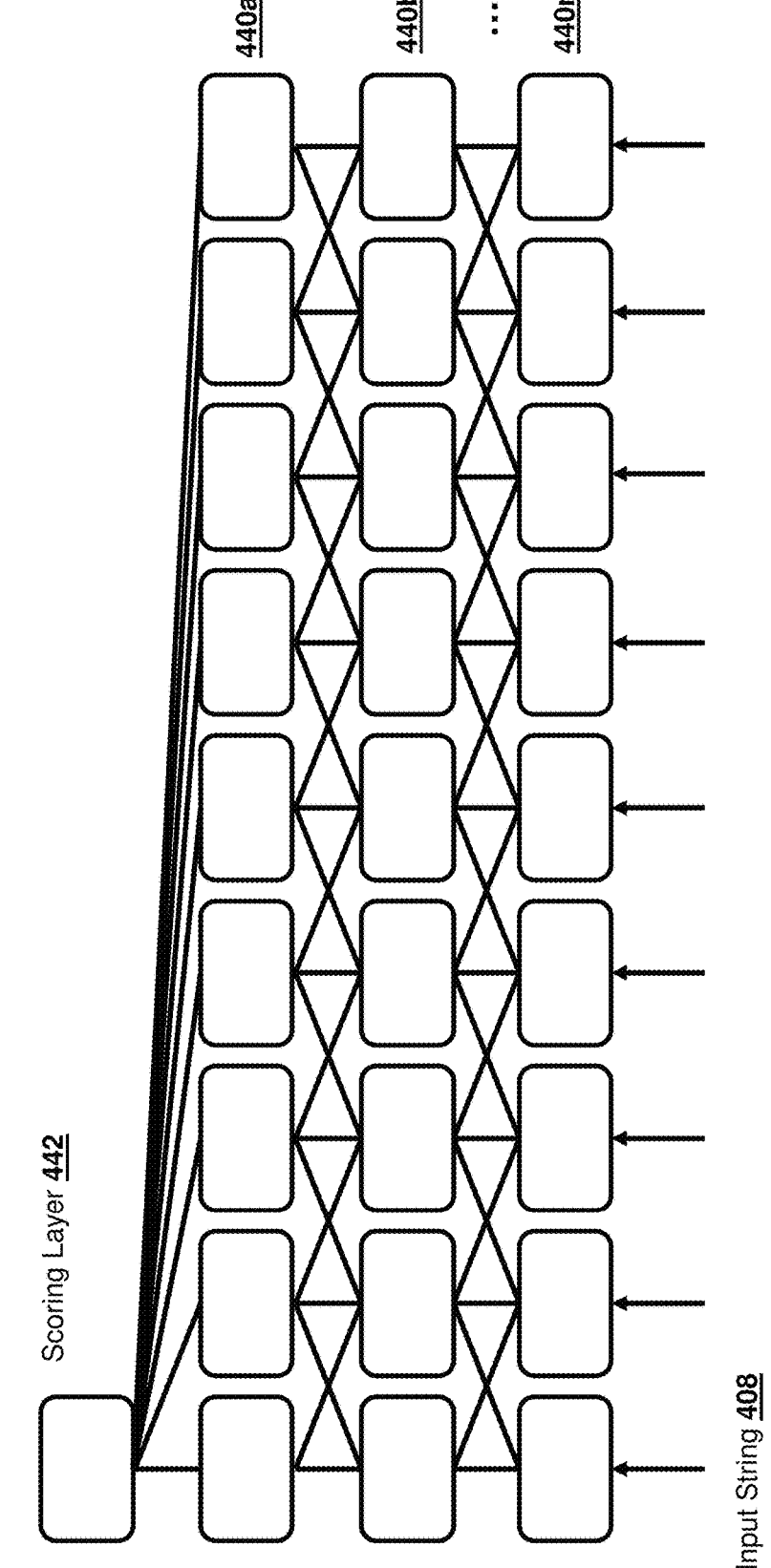
FIG. 4B is a simplified block diagram of the ranker shown in FIG. 4A, as described with respect to FIG. 4A.

FIG. 4B is a simplified block diagram of ranker 412, as described with respect to FIG. 4A. Ranker 412 uses user query 402, user context 404, and other context 406 to score each search app 420a-420n. Accordingly, the ranker 412 is run once for each search app 420 being ranked.

Ranker 412 decides a ranked order 430 over the set of search apps 420 Si. Given the input sequence $s_{a_i}$ as described above with reference to FIG. 4A, ranker 412 runs a Transformer over the input sequence to get $$\{X_{l_{a_i}}\}$$

for each search app 420. Each input sequence $s_{a_i}$ is reduced to a single vector via a pooling mechanism (e.g., mean, maximum, minimum, convolutional, etc.) and multiplied by shared $W_b \in \mathbb{R}^{1 \times d}$ to get a score for that search app 420.

$$\text{score}(s_{a_i}) = w_b \text{Pool}(LayerNorm(X_{l_{a_i}}))$$

This process is repeated for each search app 420a-420n. The ranked order 430 is then determined by sorting these scores.

Figure 4C:
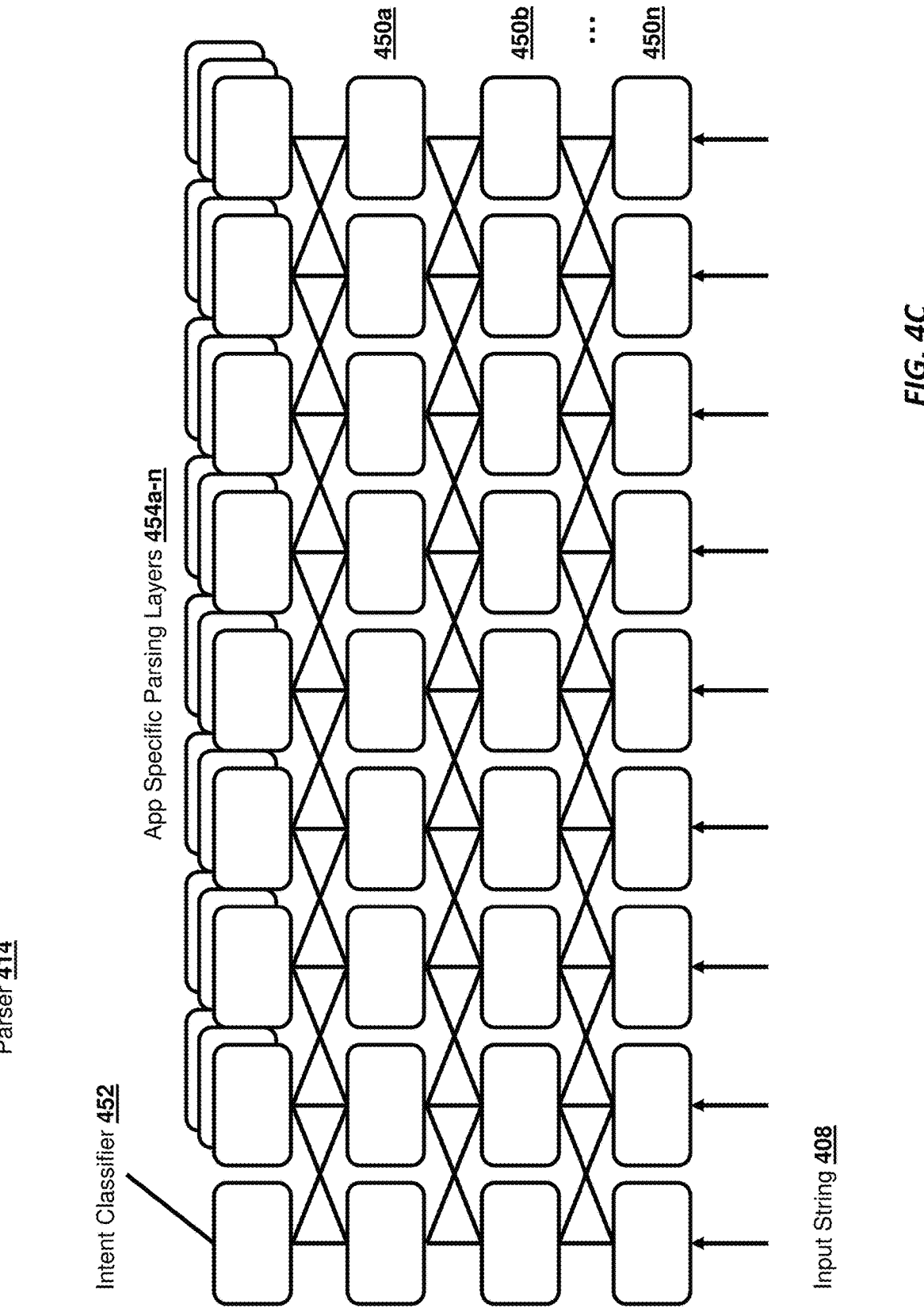
FIG. 4C is a simplified block diagram of the parser shown in FIG. 4A, as described with respect to FIG. 4A.

FIG. 4C is a simplified block diagram of parser 414, as described with respect to FIG. 4A. Parser 414 tags each input of x with a marker of whether it corresponds to an input of a search app API 422. Parser 414 operates on sequence x as described above, and computes the final output of the underlying Transformer architecture $X_l$. Instead of pooling and computing scores for each search app 420a-420n, parser 414 applies the following equation:

$$SlotScores_{ai}(x) = LayerNorm(X_l)W_{a_i}$$

In the above equation, $SlotScores_{ai}$ determine for each toke in the input sequence x whether that toke corresponds to a particular input (or slot here to disambiguate from its own input) in the ith search app API 420, e.g., departure location, destination, etc. Each search app 420 has its own corresponding parameters $W_{a_i}$ with entries corresponding to each slot that needs to be tagged for computing scores over its slots.

Example Workflows

FIG. 5 is an example logic flow diagram illustrating a method of search based on the framework shown in FIGS. 1-4C, according to some embodiments described herein. One or more of the processes of method 500 may be implemented, at least in part, in the form of executable code stored on non-transitory, tangible, machine-readable media that when run by one or more processors may cause the one or more processors to perform one or more of the processes. In some embodiments, method 500 corresponds to the operation of the search platform module 230 (e.g., FIGS. 1-4A) that performs searches based on user inputs and provides user-engageable elements containing search results.

At step 502, an input query is received via a data interface. As shown in FIG. 4A, according to some embodiments, this input query may include one or more of user query 402, user context 404, or other context 406. In some embodiments, this input query is provided by a user through user interaction with the search system, such as by entering a search query into the search system.

In some embodiments, an input sequence may be generated by concatenating the input query (e.g., "Richard Socher," "Quasi Recurrent Neural Network," etc.) and a user context associated with a user who initiated the input query. The user context may include any combination of user profile information (e.g., user ID, user gender, user age, user location, zip code, device information, mobile application usage information, and/or the like), user configured preferences or dislikes of one or more data sources (e.g., as shown in FIG. 8H, 8J), and user past activities approving or disapproving a search result from a specific data source. In some embodiments, the input sequence further comprises supplemental context comprising contextual information from one or more data sources pertinent to the input query. This supplemental context may include indications of "popular search," "top search," "others are also searching . . .," "hashtags," and other trending topics. The supplemental context may take into consideration global trends, local trends, news topics, or other relevant information based on current popularity. The supplemental context may also take into consideration searches of similar users, searches over a recent time period, searches from a geographic area, or other contextual information that may be pertinent to the input query. In some embodiments, a search input may be generated by a parsing neural model based on the input sequence.

At step 504, the search system determines a first data source and a second data source that are relevant to the input query based at least in part on characteristics of a potential search object from the input query. As shown in FIG. 4A, according to some embodiments, this determination of relevant data sources is performed using the input query, including user query 402, user context 404, or other context 406. In some embodiments, this determination of relevant data sources is based at least in part on characteristics of a potential search object from the input query. For instance, if the input query includes a name, such as "Richard Socher," relevant data sources may include "Twitter," "Facebook," "Instagram," "TikTok," or other social media websites. If the input query includes a food, such as "pumpkin pie," relevant data sources may include "All Recipes," "Food Network," or other food-related websites. If the input query is related to coding, such as an error in python, relevant data sources may include "StackOverflow," "Reddit," or other webpages or blogs oriented towards coding assistance.

In some embodiments, the determination of a first data source and a second data source that are relevant to the input query comprises generating an input sequence by concatenating the input query and a user context associated with a user who initiated the input query. A ranking neural model (e.g., see 412 in FIG. 4A) may then generate a relevance score for each data source based on the input sequence, and using the relevance score, determine whether each data source is relevant based on whether the respective relevance scores are greater than a threshold. Each data source may be ranked based on the respective relevance scores. In some embodiments, an indication may be generated by a parsing neural model for each data source.

At step 506, the search system may examine and filter the determined data sources based on stored user preferences of data sources, and generate/transmit search inputs customized for each data sources. In one implementation, if the user has previously selected a particular data source as a preferred data source, the search system may include and prioritize this particular data source. In one implementation, if the user has previously deselected or disapproved a particular data source, the search system may exclude this particular data source even if this data source may be determined as relevant at step 504.

In one implementation, the search system may universally apply user preferred data sources in the search. For example, if "Wikipedia" has been selected by the user as a preferred data source, the search system may always place a group of search results from "Wikipedia" in the search for the user.

In another implementation, the search system may categorize user preferred data sources based on its type. For example, if "LinkedIn" has been selected by the user as a preferred data source, the search system may store "LinkedIn" as a preferred data source for a specific type of query (e.g., relating to human names), and may not prioritize searches at "LinkedIn" when the query is irrelevant to a person's name (such as "high performance instant pot").

In alternative implementations, at step 506, the search system may transmit, via search application programming interfaces (APIs 422*a-n* in FIG. 4A), a first search input and a second search input to respective first and second data sources. The search inputs may be customized from the input query for each data source. Additional context may be received from each search app API relating to the input query from the data sources, and the additional context may be used to determine which portion of the input query corresponds to each search app API. For example, for a search app API with data source "LinkedIn.com," the search input may be customized as "Posts mentioning Richard Socher," "pages mentioning Richard Socher," users named "Richard Socher," stories mentioning "Richard Socher," hashtags, when the user input query is "Richard Socher."

At step 508, the search system obtains and/or generates a first set of search results from the first data source and a second set of search results from the second data source. These search results correspond to results 431*a*-431*n* as shown in FIG. 4A. Each set of search results is obtained and/or generated for a different search app 420*a*-420*n*, where each set of search results is ranked in a ranked order 430 as determined by ranker 412 and parser 414.

At step 510, the search system presents, via a user interface, a first user-engageable panel containing the first set of search results with a first indication of the first data source and a second user-engageable panel containing the second set of search results with a second indication of the second data source. These search results may be presented in user-engageable elements 700, as shown in FIG. 7 and FIGS. 8A-8K. Example UI diagrams can be found in FIGS. 8A-8K. Each set of search results generated at step 508 may be displayed in an additional user-engageable element at step 510, such that each set of search results 431*a*-431*n* (as shown in FIG. 4A) are generated and displayed to the user in corresponding user-engageable elements. In some embodiments, each user-engageable panel is presented in a ranked order according to the ranking determined in step 504.

FIG. 6 is an example logic flow diagram illustrating a method of customized search based on the framework shown in FIGS. 1-4C, according to some embodiments described herein. One or more of the processes of method 600 may be implemented, at least in part, in the form of executable code stored on non-transitory, tangible, machine-readable media that when run by one or more processors may cause the one or more processors to perform one or more of the processes. In some embodiments, method 600 corresponds to the operation of the search platform module 230 (e.g., FIGS. 1-4A) that performs searches based on user inputs and provides user-engageable elements containing search results.

At step 602, a set of one or more ranked results are presented to a user via user-engageable elements. These results may be determined, for example, as discussed above for FIG. 5. In some embodiments, each search app 420*a*-420*n* (e.g., FIG. 4A) that is ranked and parsed by platform 410 will be sorted and presented to the user via a ranked order. Each search app 420*a*-420*n* will have a corresponding user-engageable element that allows the user to interact with search results, the search app 420, At step 604, a user interacts with one or more of the search apps 420*a*-420*n* displaying results via the user-engageable elements, such as approval element 704 and disapproval element 706 shown in FIG. 7. For instance, in a search where the input query includes a food, such as "pumpkin pie," relevant data sources may include "All Recipes," "Food Network," or other food-related websites. The user may interact with the "All Recipes" approval element 704 in user-engageable element 700 to indicate a preference for the "All Recipes" source. The search system may then use this information to update user preferences to use the "All Recipes" source for other food-based input queries. The user may also interact with the "Food Network" disapproval element 706 in user-engageable element 700 to indicate a negative preference for the "Food Network" source. The search system may then use this information to update user preferences to avoid the "Food Network" source for other food-based input queries.

In some embodiments, when a user selection of an additional data source is received, a new search input is customized from the input query to the respective data source and transmitted via a search app API integrated at the server of the additional data source. A set of search results from the data source may be received and presented via a user-engageable panel displaying the search results, as discussed further above and below.

At steps 606/616, the user's preferences are updated based on the inputs provided. These user preferences may be included as user context 404 (e.g., FIG. 4A) to better tailor search results for the user. Following the example above, at step 606, this may involve updating the user's preferences to reflect an increased desire to see the "All Recipes" source. Meanwhile, at step 616, this may involve updating the user's preferences to reflect a decreased desire to see the "Food Network" source.

In some implementations, a user may directly configure a preference or dislike of a data source (e.g., see FIG. 8H, 8J). The search platform may thus include or exclude search apps corresponding to the preferred or disliked data sources in the search (e.g., as filtered by the ranker 412) accordingly. In some implementations, the search platform may apply rule-based criteria to filter data sources based on user past activities with respect to search results from a particular data source. For example, when a user dislikes a search post from Twitter.com, the search platform may not exclude Twitter.com from future search. However, if the user constantly dislikes search results from Twitter.com (e.g., more than a pre-defined times per day, per week, per percentage of total searches, etc.), the search platform may deprioritize or exclude Twitter.com from future search.

At steps 608/618, the search results are updated based on the user's interactions with the system. Following the example above, at step 608, this may involve increasing the ranked order 430 position for the result 431 corresponding to the "All Recipes" source (e.g., FIG. 4A). At step 616, this may involve decreasing the ranked order 430 position for the result corresponding to the "Food Network" source, or alternatively, may result in the removal entirely of the "Food Network" source from the results 431*a*-431*n* displayed to the user.

At steps 610/620, the updated results are presented to the user. These results may be presented to the user in ranked order 430, where each result 431*a*-431*n* is shown in a user-engageable element 700 as discussed in further detail below for FIG. 7.

In some embodiments, the user may instead interact with additional user-engageable elements to provide an indication regarding search apps 420 which are not included within the ranked order of search apps presented to the user. In such instances, the search system will update user preferences as discussed above for step 606. The search results may be updated in step 608 to increase the rank of the search app 420 or to add the search app 420 to the search results, if it was not already there, based on the input from the user-engageable element.

Figure 7:
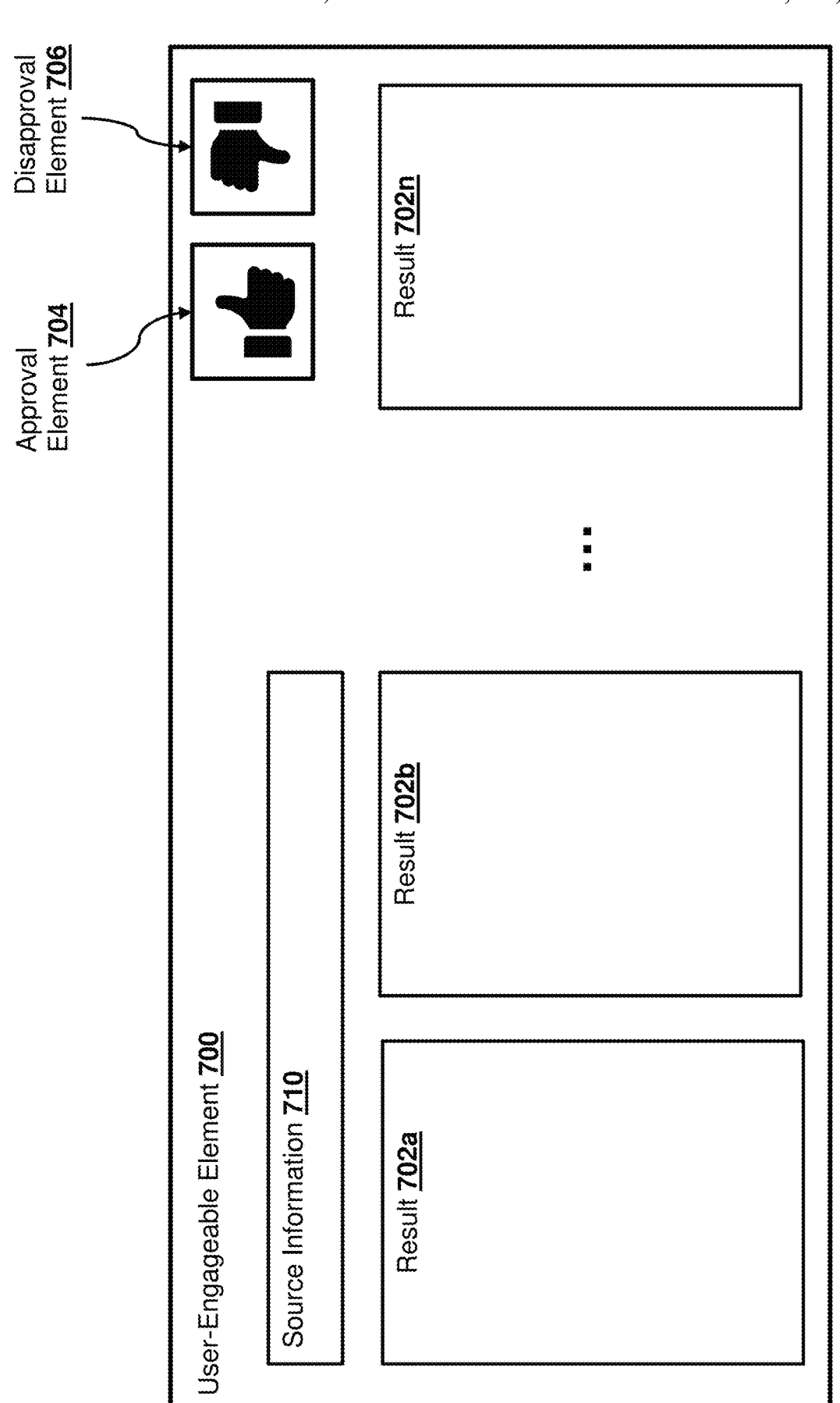
FIG. 7 is a simplified block diagram of an example search interface implementing the customized search platform framework described in FIGS. 5-6 and other embodiments described herein.

FIG. 7 is a simplified block diagram of an example search interface implementing the customized search platform framework described in FIGS. 5-6 and other embodiments described herein. FIG. 7 depicts user-engageable element 700, and one or more user-engageable elements 700 may be presented to a user via a user interface, where each user-engageable element contains sets of search results.

User-engageable element 700 may include source information 710 providing information to users with important or useful information on what source is providing the results 702a-702n shown in user-engageable element 700. For instance, this may be a website name to indicate that results 702a-702n are shown from a specific website related to the search input query. User-engageable element 700 corresponds to a single search app 420 as depicted in FIG. 4A, where the first user-engageable element 700 shown to a user is the first result in ranked order 430 (e.g., result 431a), and each subsequently shown user-engageable element 700 is the next result 431 in ranked order 430.

Each user-engageable element 700 may provide one or more results 702a-702n, which include web pages, social media posts, blog posts, recipes, videos, code segments, or other content relevant to a search query. Each result 702 may be user-engageable, and may allow the user to visit the web page, interact with the social media post directly, comment on blog posts, read and save recipes, watch videos, copy code, provide feedback, or otherwise interact with the content in each result 702. Each user-engageable element 700 may also provide users to indicate their preference for the data source, using approval element 704 and disapproval element 706, as discussed in further detail for FIG. 6 above.

FIGS. 8A-8K are exemplary search interfaces 800a-800k implementing the customized search platform framework described in FIGS. 5-6 and other embodiments described herein.

Figure 8A:
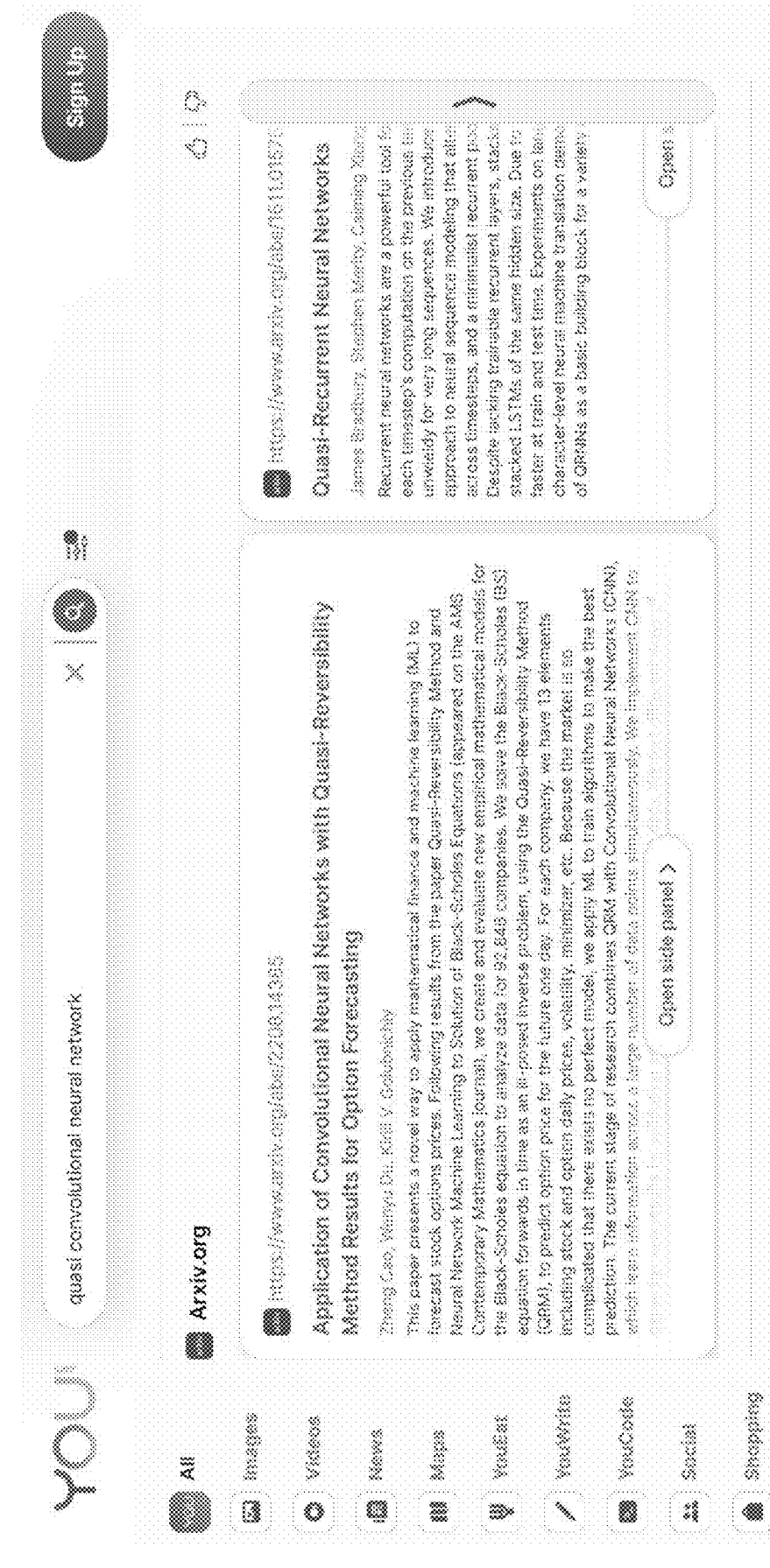
FIGS. 8A-8K are exemplary search interfaces implementing the customized search platform framework described in FIGS. 5-6 and other embodiments described herein.

As seen in FIG. 8A, a customized search platform framework is utilized to allow users the option to perform a search and select data sources of the search. A user may search for a query, such as "quasi convolutional neural network," and the customized search platform may determine that according to the characteristics of this user query (e.g., a name of a scientific term, etc.), the data source "arXiv" provides the most relevant results and prominently display the data source to the user along with a list of search results that are provided specifically from "arXiv." The search results from "Arxiv.org" are presented in a form of a slidable horizontal panel such that the user may engage with the panel to "slide" and view a list of results in panel.

Figure 8B:
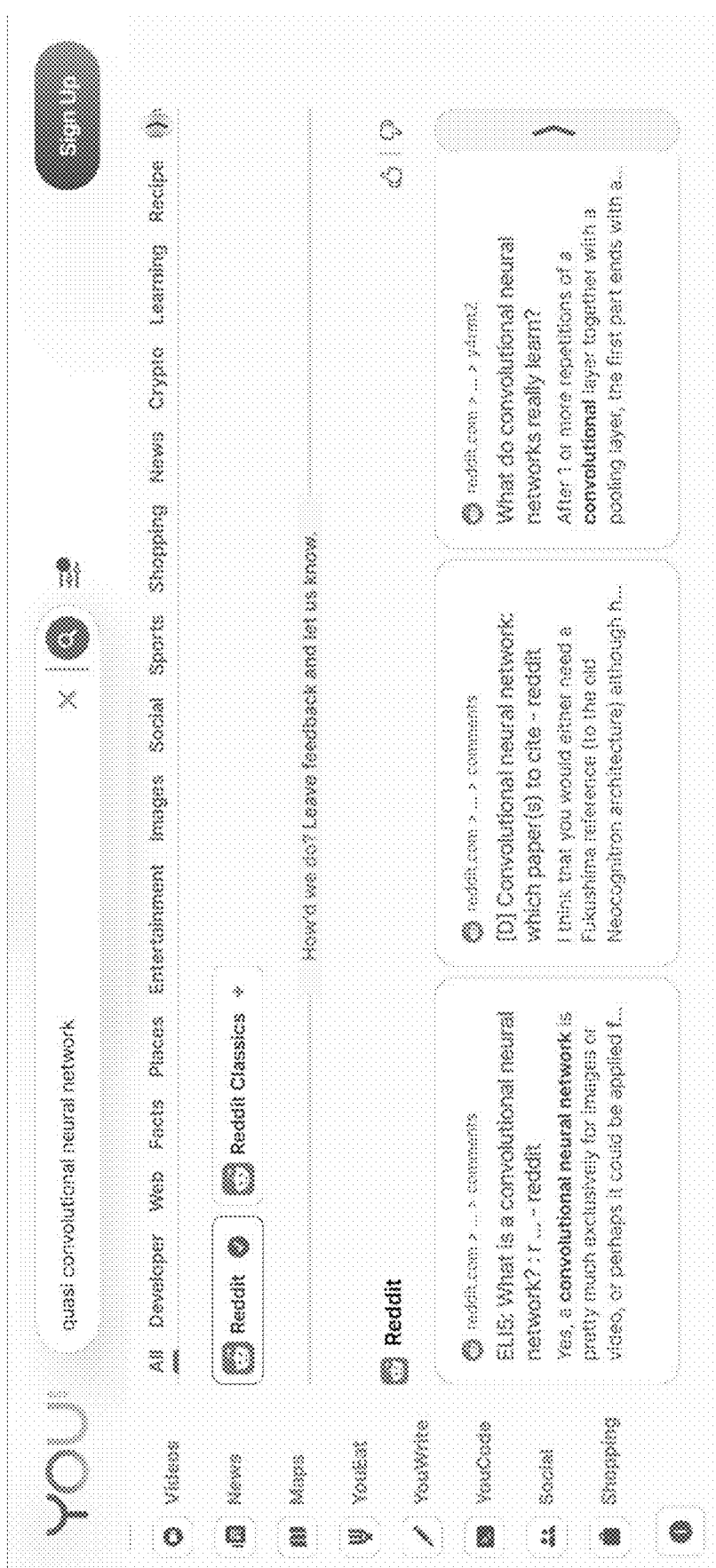

As seen in FIG. 8B, for the same search query "quasi convolutional neural network," the customized search platform may determine that "Reddit" is another relevant data source (e.g., search app) but may be ranked lower than "Arxiv.org." Thus, search results from "Reddit" may be presented in another slidable horizontal panel that is displayed below the panel for "Arxiv.org," such that the user may engage with the panel to "slide" and view a list of results in panel.

Figure 8C:
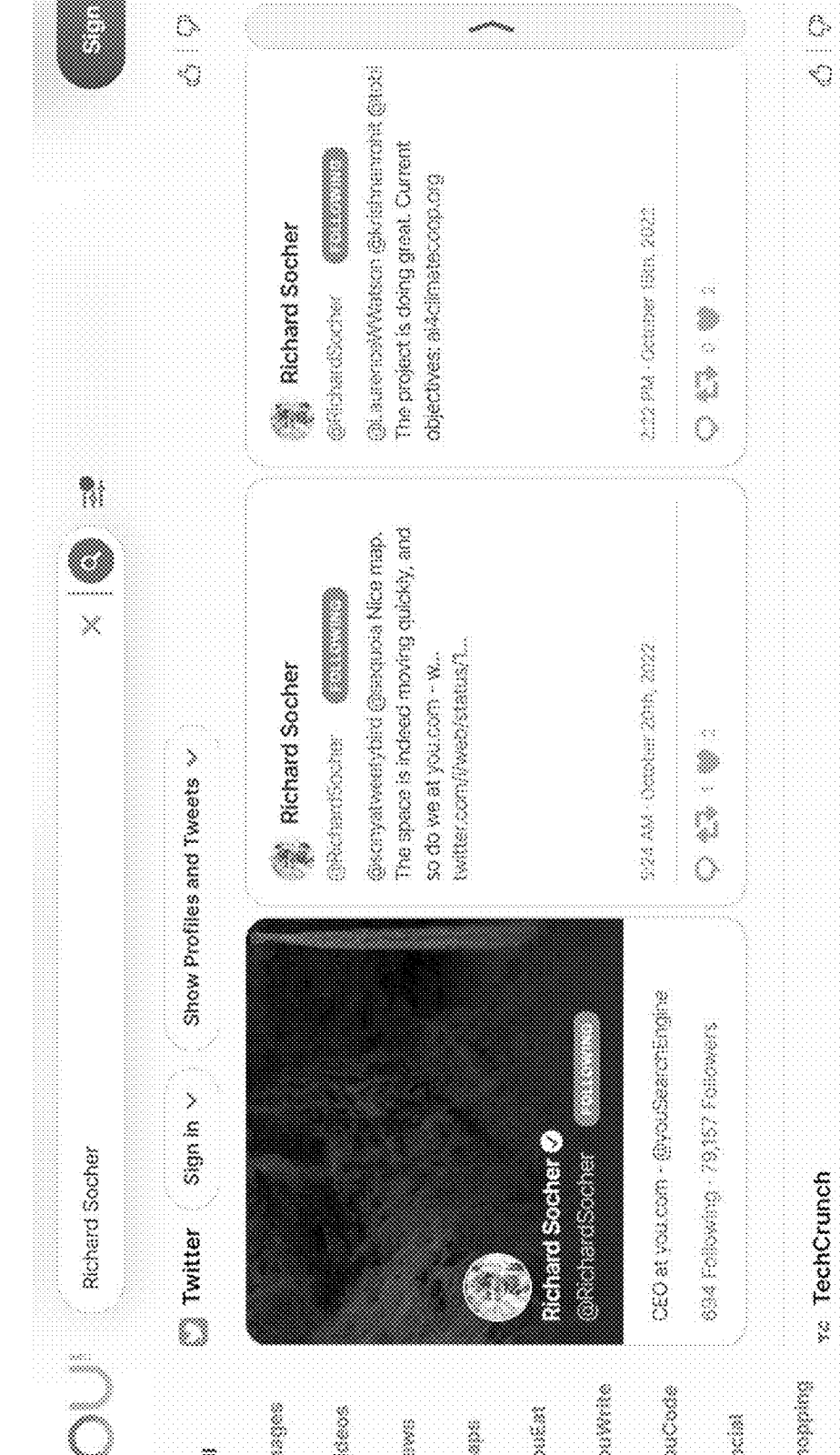

As seen in FIG. 8C, when the search query is "Richard Socher," the customized search platform may determine that according to the characteristics of this user query (e.g., a name of a human being, etc.), the data source from social media, such as "Twitter" provides the most relevant results and prominently display the data source to the user along with a list of search results that are provided specifically from "Twitter." The search results from "Twitter" are presented in a form of a slidable horizontal panel such that the user may engage with the panel to "slide" and view a list of Tweets from the user "Richard Socher" or mentioning "Richard Socher" in panel.

Figure 8D:
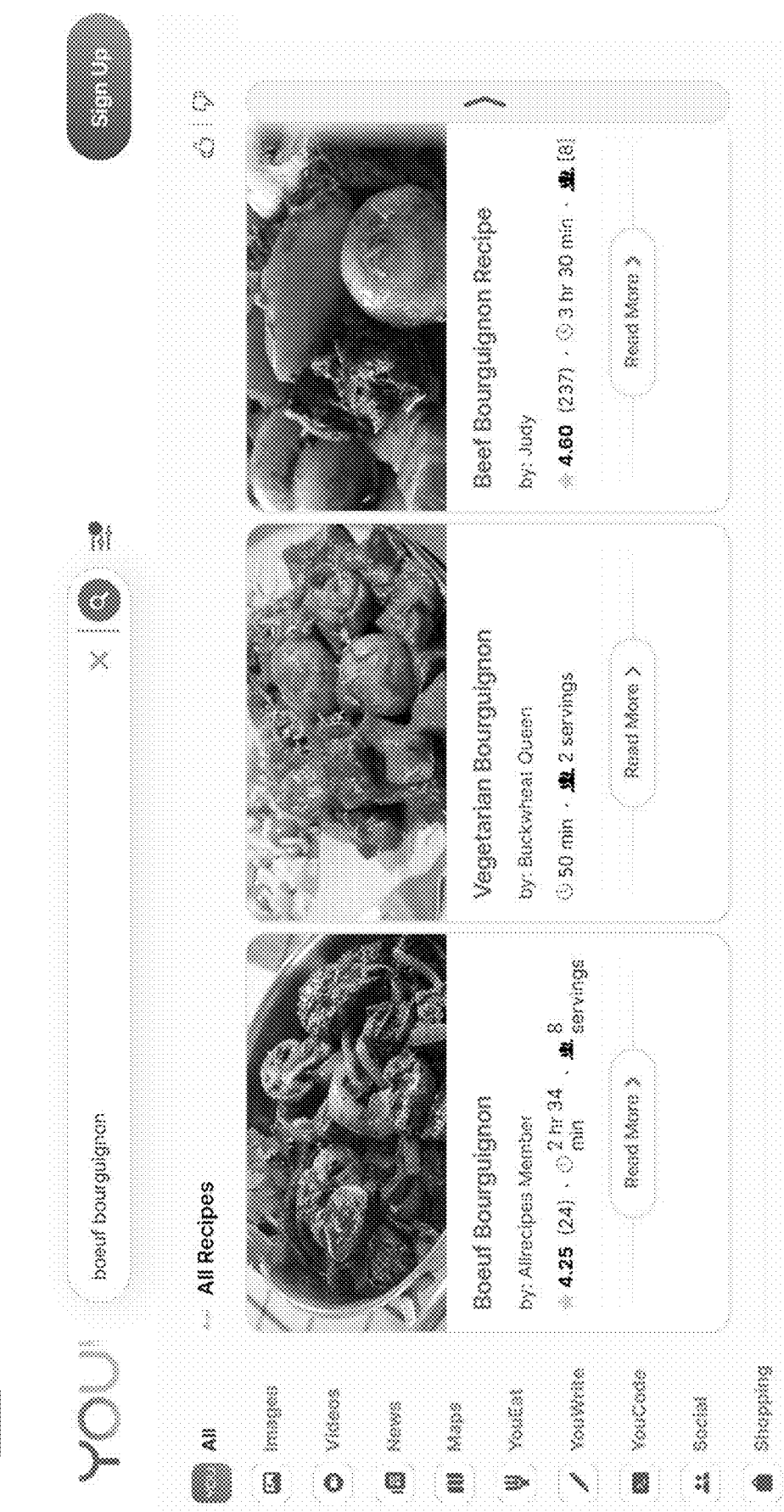

In another example as seen in FIG. 8D, if the user enters the query "Boeuf Bourguignon," the customized search platform may preliminarily determine that this search term relates to a food item, a dish, and/or a related term, and thus may recommend search results from a data source such as "Recipes.com" or "FoodNetwork."

Figure 8E:
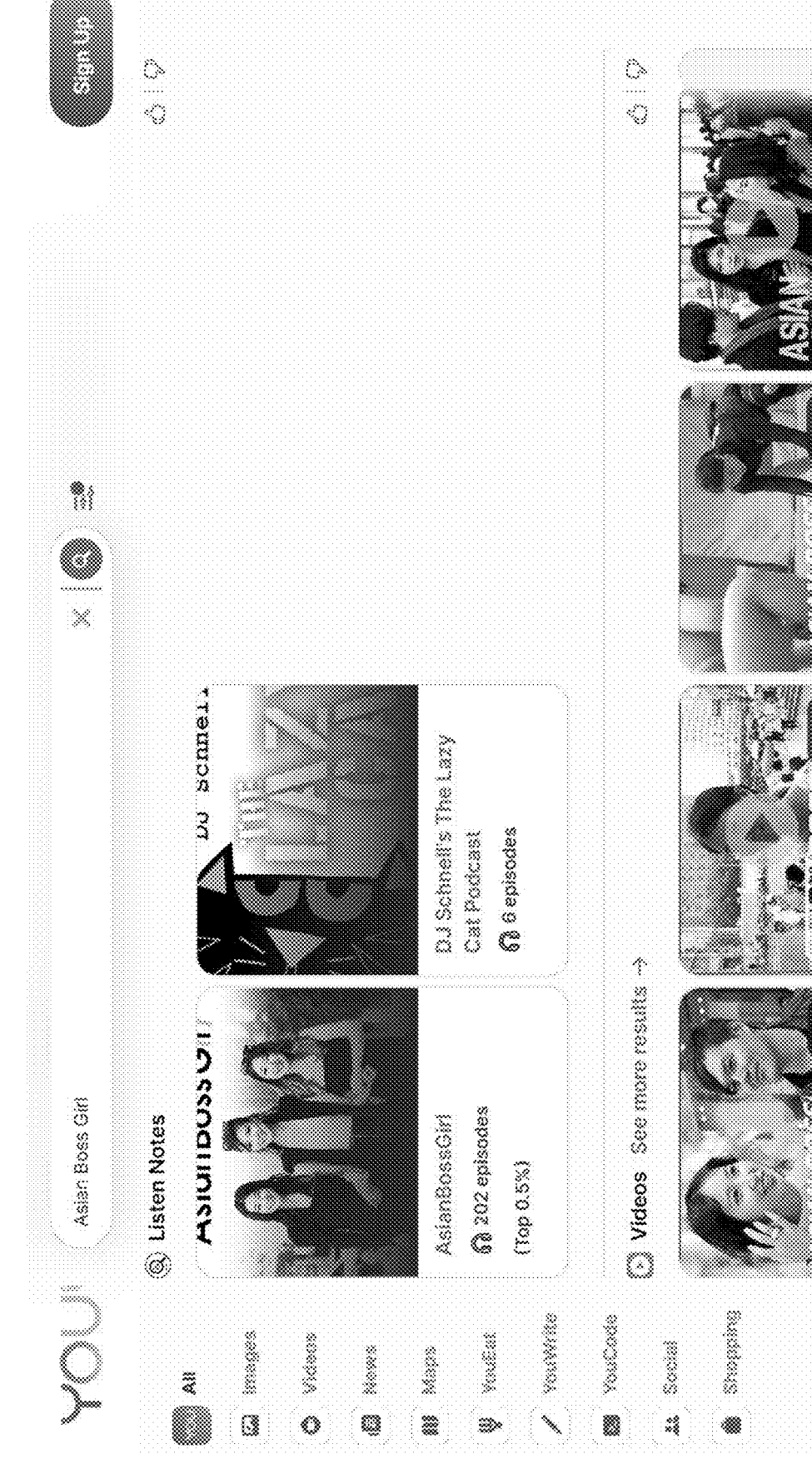

In another example as seen in FIG. 8E, if the user enters the query "Asian Boss Girl," the customized search platform may preliminarily determine that this search item is a trendy topic and may refer to the social media sensation. Therefore, the customized search platform may recommend search results from social media sources, such as "Instagram," "Pinterest," "YouTube," and/or other social media webpages.

Figure 8F:
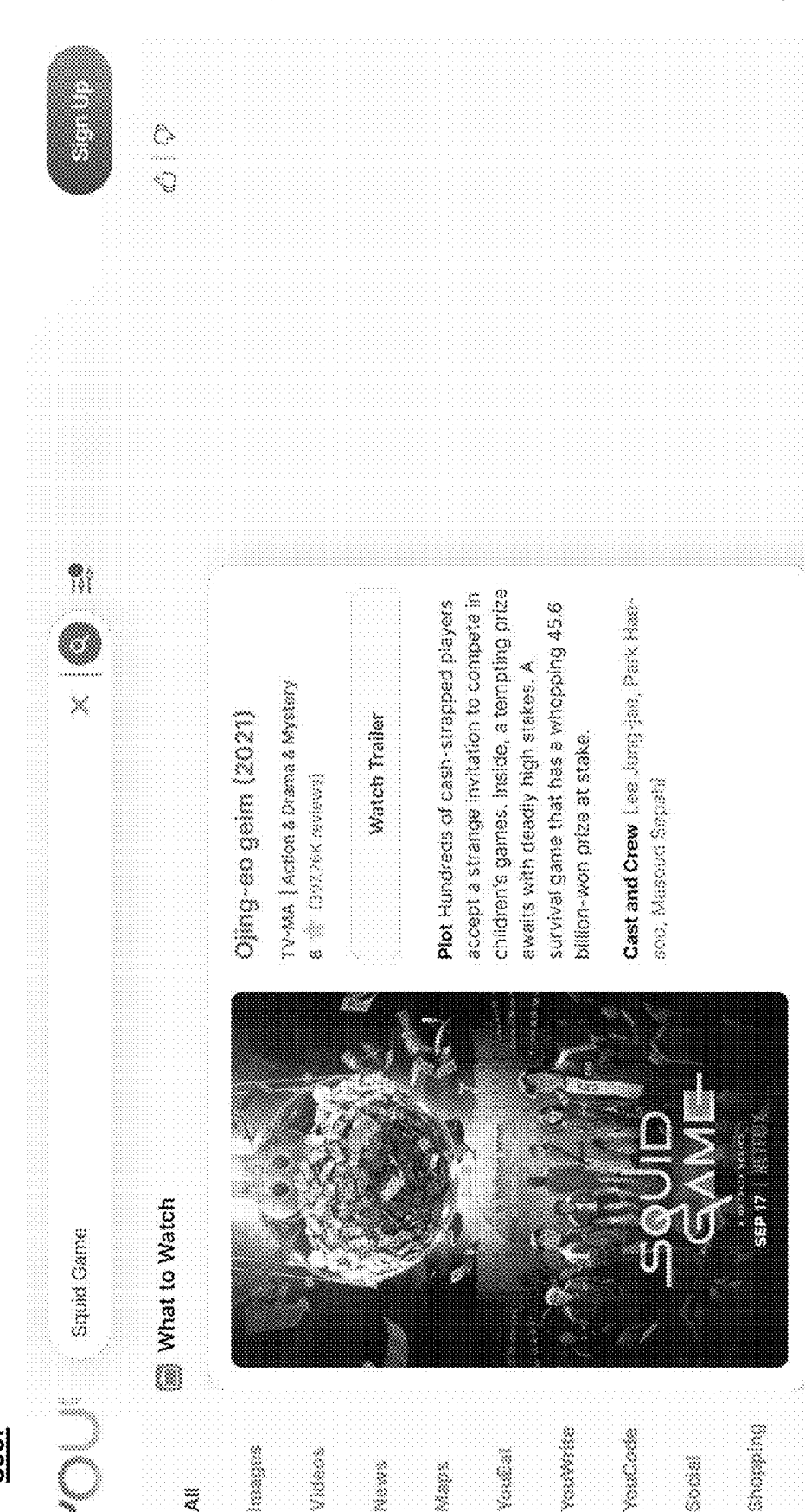

In another example as seen in FIG. 8F, if the user enters the query "Squid Game," the customized search platform may preliminarily determine that the search term relates to a media item. Therefore, the customized search platform may recommend search results from data sources providing media or details of the media item.

Figure 8G:
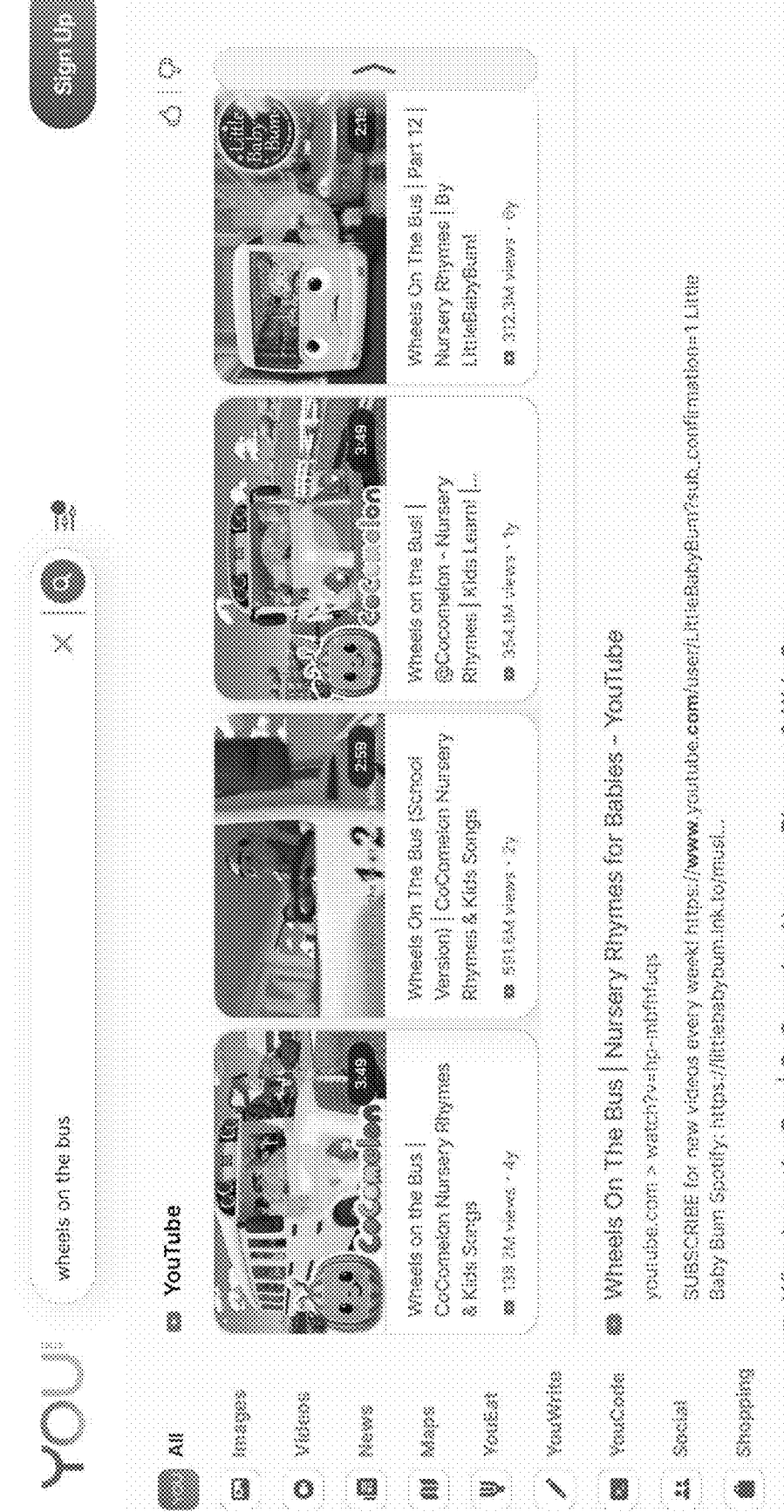
Figure 8H:
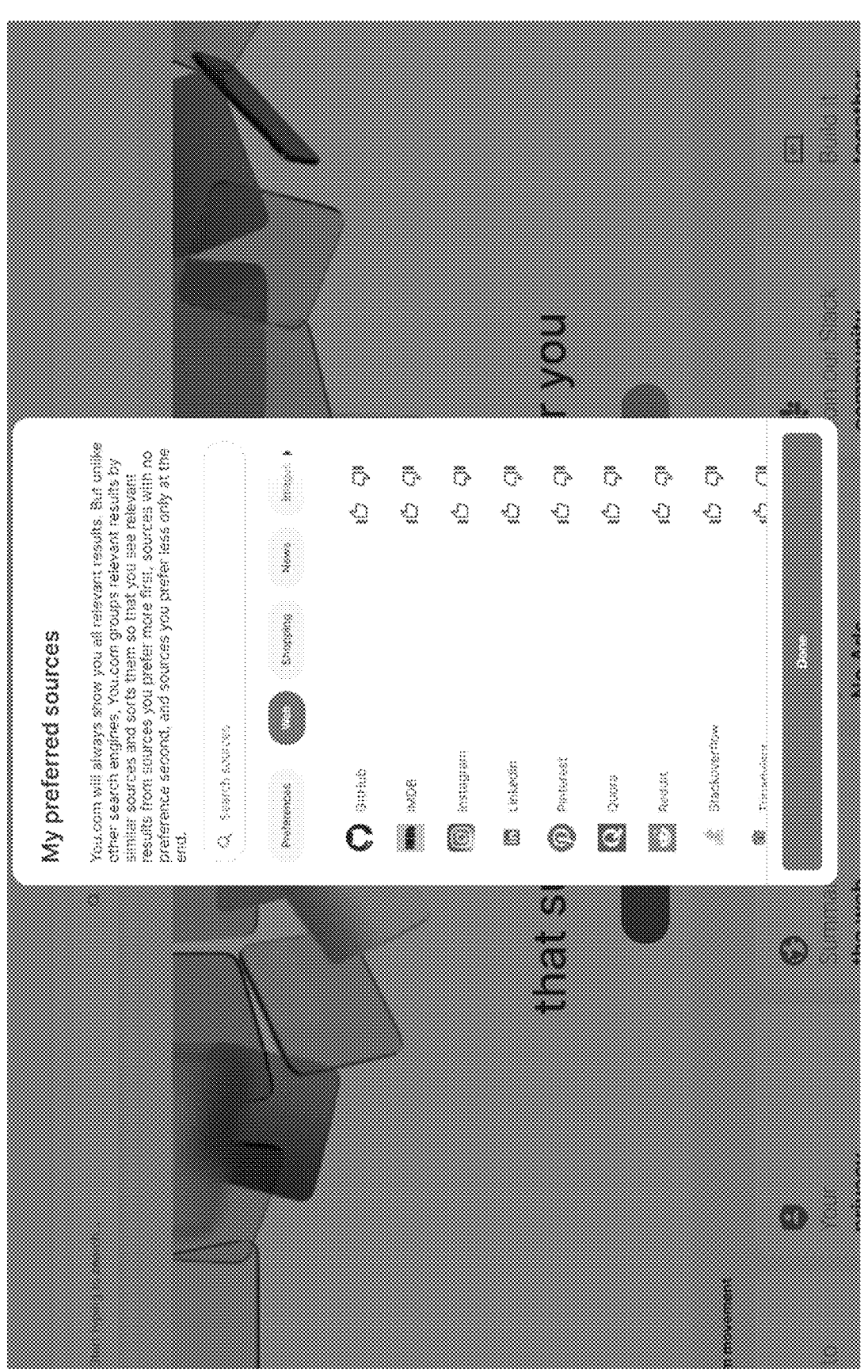

In another example as seen in FIG. 8G, if the user enters the query "wheels on the bus," the customized search platform may preliminarily determine that while the search term may be related to a media item, unlike the previous example of "Squid Game," the query "wheels on the bus" refers to an old-fashioned nursery. Therefore, the customized search platform may recommend search results from sources providing content aimed at the nursery rhyme, such as videos from "YouTube," "TikTok," or some other video source.

As seen in FIG. 8H, the customized search platform allows a user to customize their preferred data sources. A user may choose to submit whether they prefer or do not prefer a particular data source by clicking on an icon to show that preference or approval, such as a "thumbs up" or "thumbs down" icon. Based on the user submitted preferences, the customized search platform may rearrange and reprioritize search results. For example, if a user has elected "thumbs up" (e.g., approval) for "LinkedIn" but "thumbs down" (e.g., disapproval) for "Instagram," when a user searches for a person's name such as "Richard Socher," the customized search platform may prioritize results of "Richard Socher" from "LinkedIn" but may deprioritize the results from "Instagram."

Figure 8I:
Figure 8J:
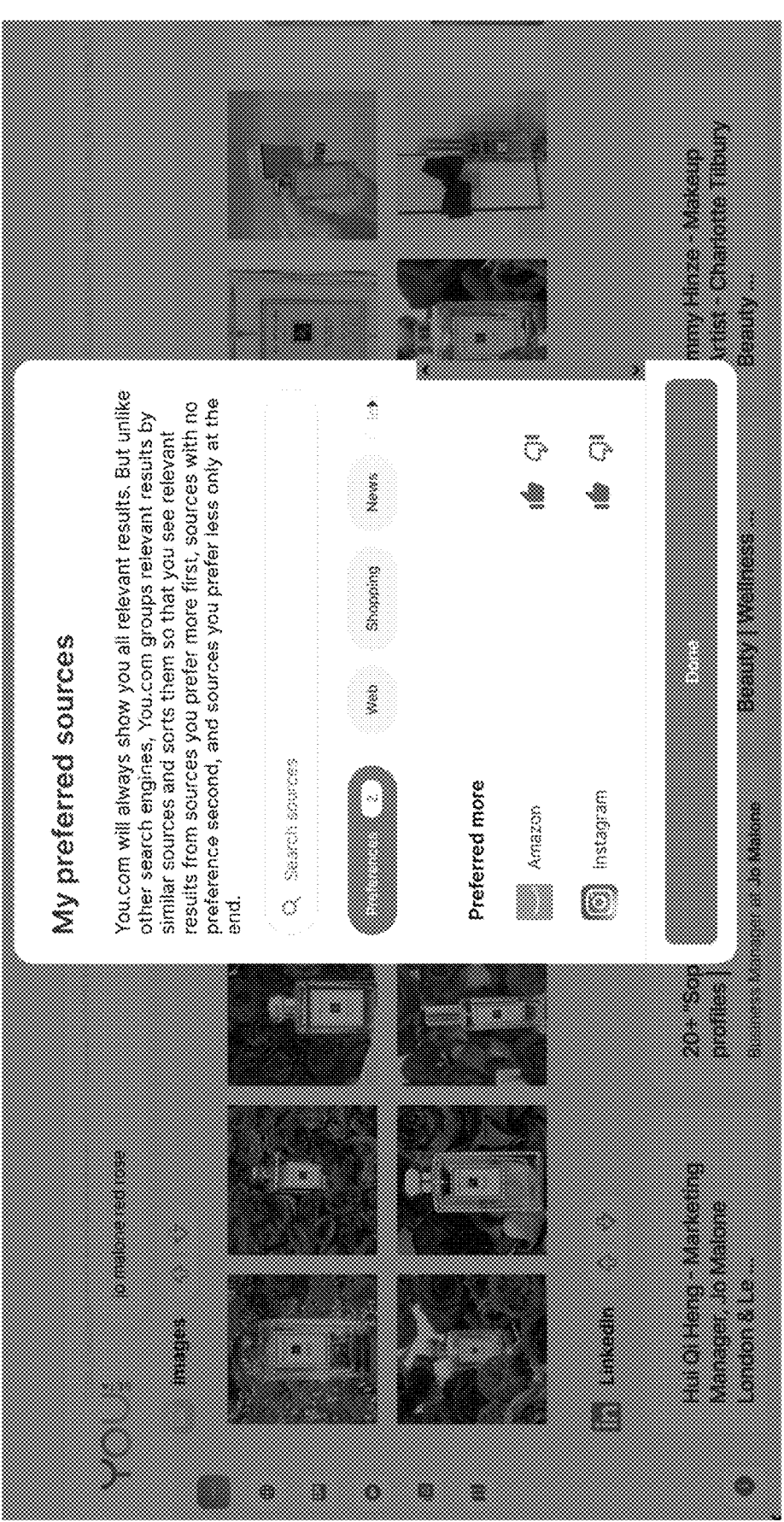
Figure 8K:
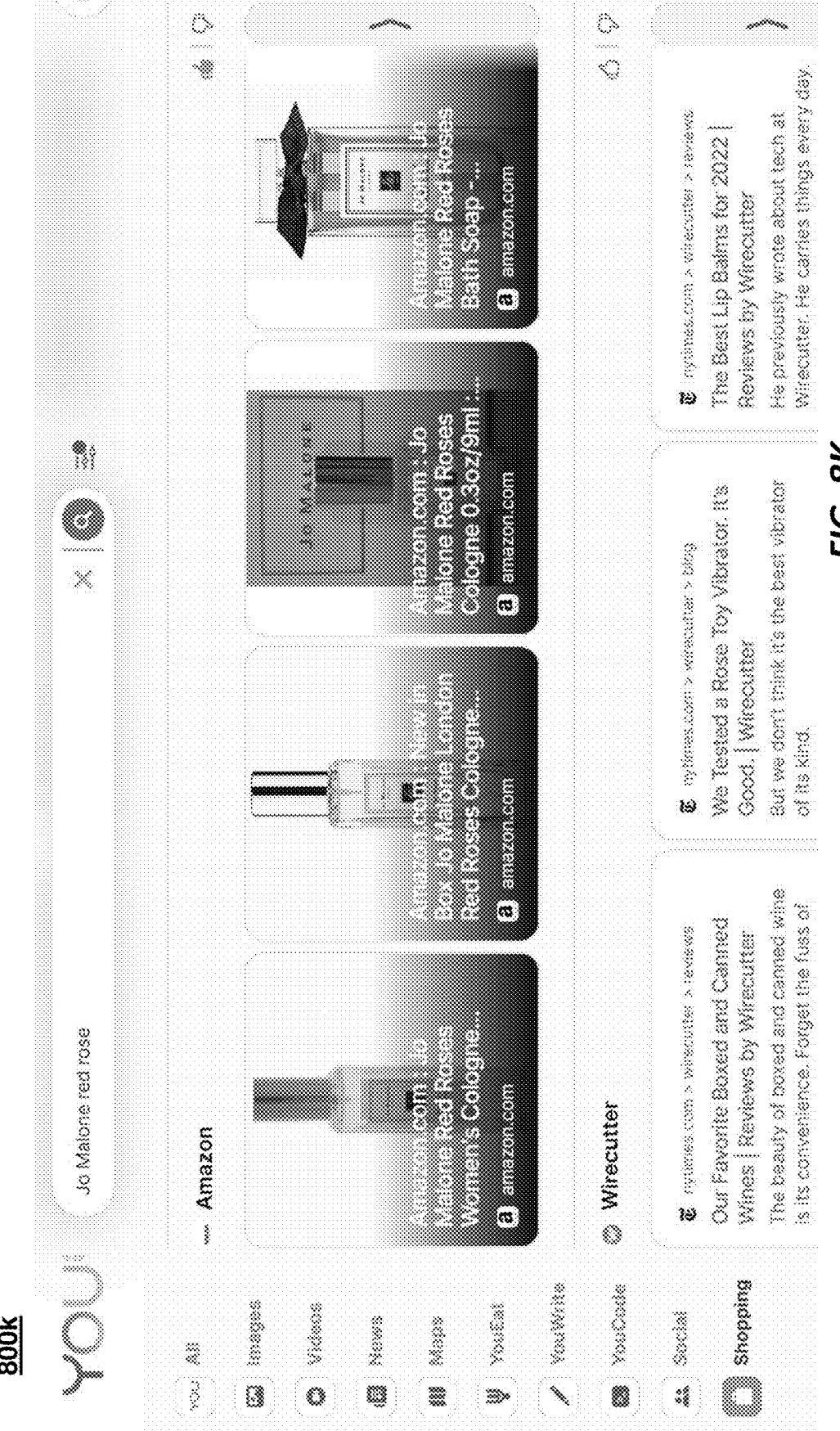

FIGS. 8I-8K show an example of a search being performed on the customized search platform before and after preferences are configured by a user. In FIG. 8I, a search is shown where a user initially enters a search query of "Jo Malone red roses," where the customized search platform may return any search results from different data sources, e.g., various shopping sites such as Nordstrom.com, Wal-mart.com, Macys.com, etc.

FIG. 8J shows one embodiment of how a user may configure their source preferences. In this example, the user has configured their source preferences by electing "Amazon" and "Instagram" as the preferred sources when the customized search platform performs searches.

In FIG. 8K, the search of FIG. 8I is repeated after the source preferences have been changed as seen in FIG. 8J. After the user configuration of source preferences, the customized search platform may preliminarily determine that the search term "Jo Malone red rose" relates to a product related to shopping. Therefore, the customized search platform may prioritize search results from the shopping site "Amazon" as per the user's preferences.

Figure 9:
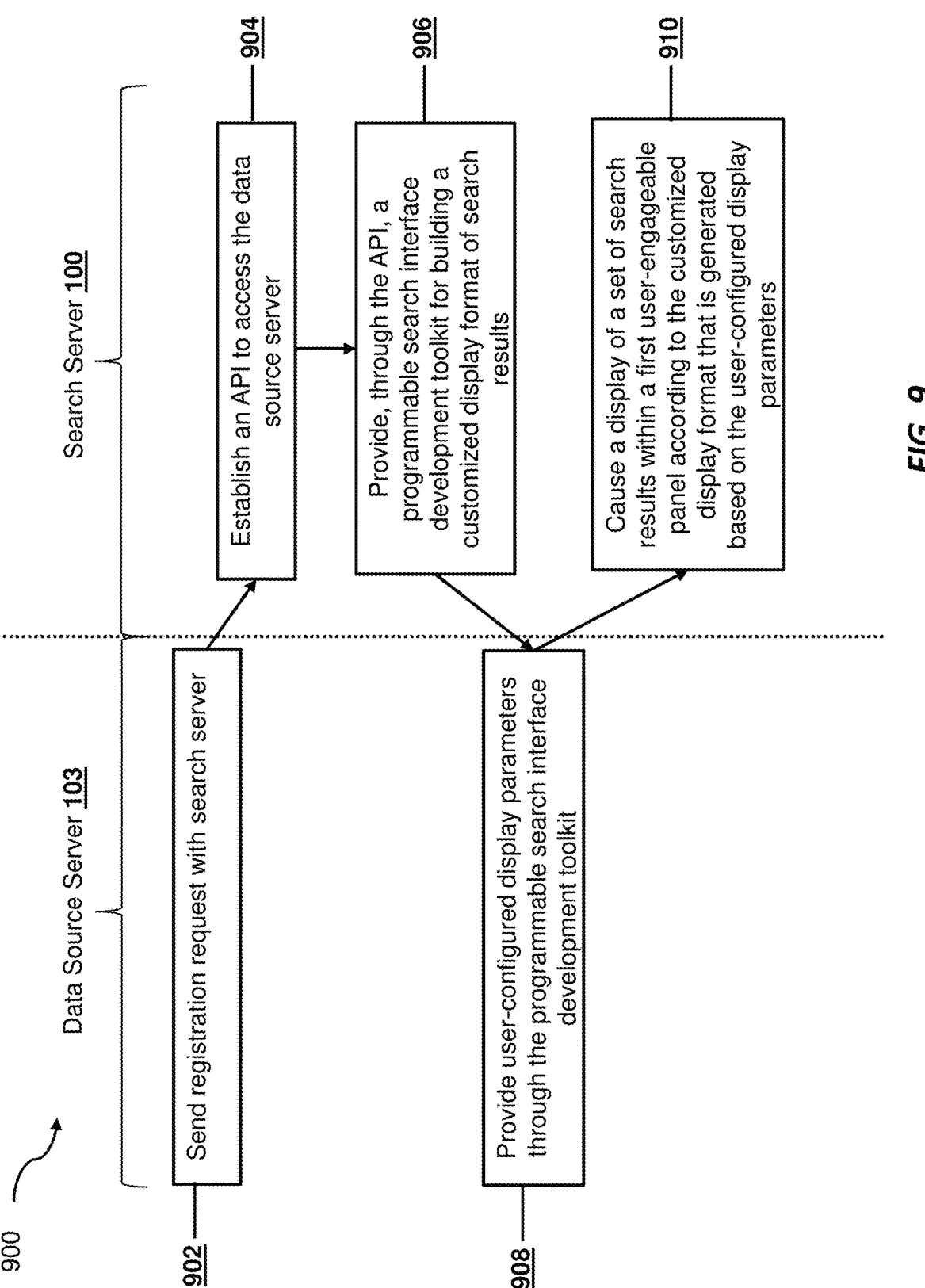
FIG. 9 is a simplified logic flow diagram illustrating providing a customized presentation of search results from a specific data source in an Internet search, according to embodiments described herein.

FIG. 9 is a simplified logic flow diagram illustrating providing a customized presentation of search results from a specific data source in an Internet search, according to embodiments described herein. One or more of the processes of method 900 may be implemented, at least in part, in the form of executable code stored on non-transitory, tangible, machine-readable media that when run by one or more processors may cause the one or more processors to perform one or more of the processes. In some embodiments, method 900 corresponds to the operation of the search platform module 230 (e.g., FIGS. 1-4A) that performs searches based on user inputs and provides user-engageable elements containing search results, and data source servers (e.g., 103*a-n* in FIG. 1, collectively referred to as 103; or data source servers 345*a-n* in FIG. 3).

At step 902, a data source server 103 may send a registration request to a search server 100 as a search partner source. For example, a registered data source partner may appear on the list for user configuration as shown in FIG. 8H.

At step 904, search server 100 may establish an application programming interface (API) to data source server 103 upon registration. In one implementation, for example, upon receiving a user search query, search server 100 may determine whether data source server 103 is a prioritized data source for the particular search (e.g., as described in FIG. 4A). The search server 100 may then transmit a search query to the data source server 103 for searching within the data source server 103.

At step 906, search server 100 may provide, through the API, a programmable search interface development toolkit for building a customized display format of search results from the data source server 103. For example, the programmable search interface development toolkit may take a form of a user interface application or a code program to be integrated into the API.

In one implementation, the programmable search interface development toolkit may comprise pre-configured display format parameters recommended by the search server 100 based on a type of the data source server. For example, the search server 100 may recommend display format parameters such as commonly used "like" button, "reply" button for a social media data source, a shopping button for a shopping data source, and/or the like. The search server 100 may adopt a neural network prediction model to predict recommended display format based on a data source, and generate the programmable search interface development toolkit (e.g., a code segment) incorporating the recommended display format parameters.

At step 908, data source server 103 may provide user-configured display parameters through the programmable search interface development toolkit. For example, the user-configured display parameters may take a form of a user selection of display elements via the user interface application, e.g., a user at the data source server may configure desirable display elements via a GUI. For another example, a user at the data source server may input a code segment into the programmable search interface development toolkit to edit a display format of search results. In another example, a user at the data source may enter a display file, e.g., a GUI design file, and/or the like. For example, the programmable search interface development toolkit configured with the user-configured display parameters may be into the API such that search results from the data source server 103 may be presented using the format specified by the user-configured display parameters. A search application (e.g., 422*a-n* in FIG. 4A) that incorporates the first API for the first data source server may be generated using the programmable search interface development toolkit embedded with the user-configured display parameters.

At step 910, in response to receiving a set of search results from the data source server 193 in the Internet search, the server 100 may cause a display of the set of search results within a user-engageable panel according to the customized display format that is generated based on the user-configured display parameters.

In one embodiment, when the search server 100 may display search results from different data source servers according to different user-configured display parameters configured by respective data source servers. For example, the search server 100 may receive another set of search results from a different data source server in the Internet search, and then causes a display of the other set of search results within another user-engageable panel. The different user engageable panels displaying search results from different data sources servers may have different formats according to the type of the respective data source servers, and according to different data source configured display parameters.

In one implementation, the search server 100 may further receive a modification to the user-configured display parameters through the programmable search interface development toolkit. The search server 100 may cause an updated display of the set of search results within the user-engageable panel according to an updated display format that is updated by the modification to the user-configured display parameters in real time.

Figure 10A:
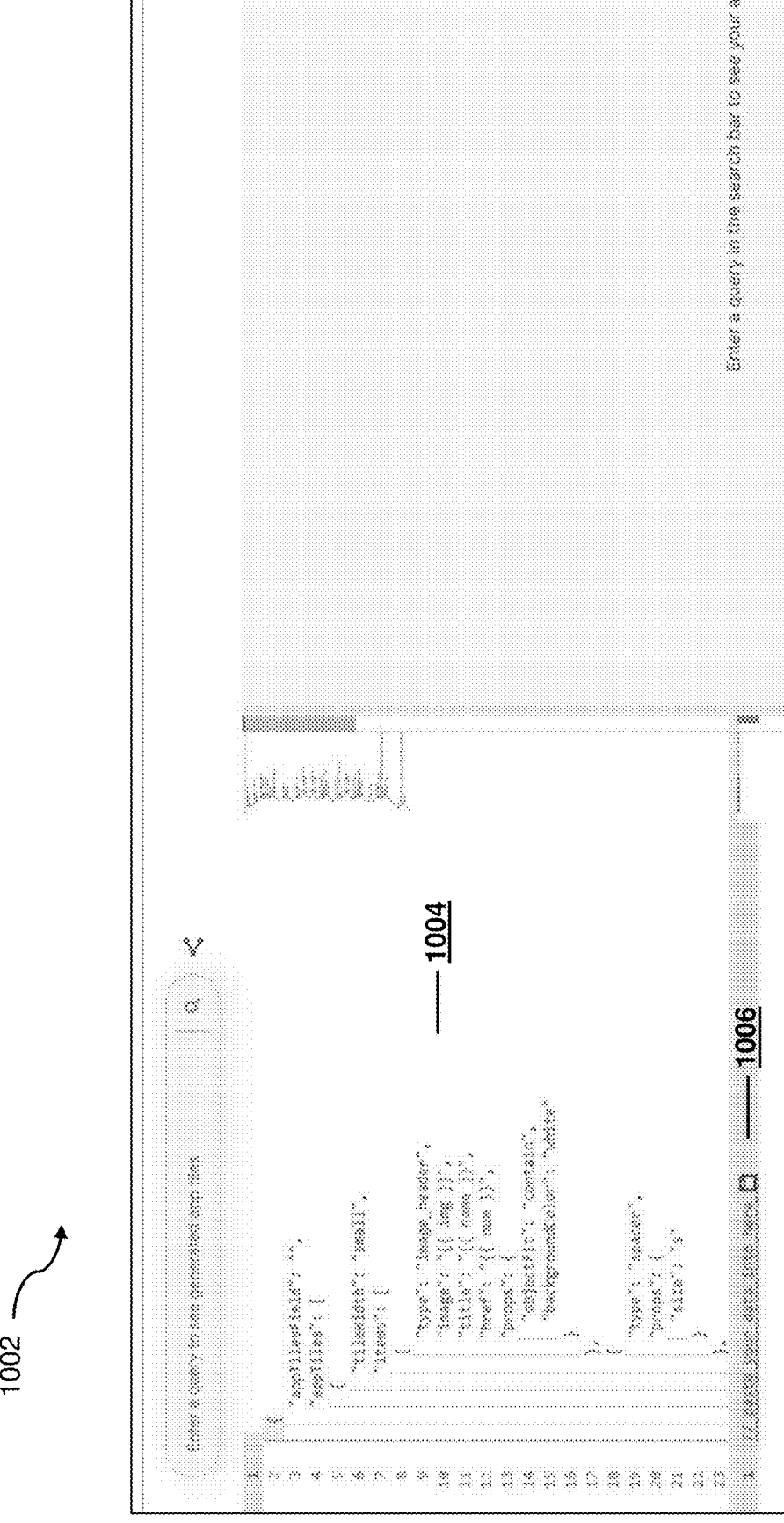
FIGS. 10A-10B provide example user interface (UI) diagrams illustrating a user at a search partner configuring customized presentation of search results, according to embodiments described herein.
Figure 10B:
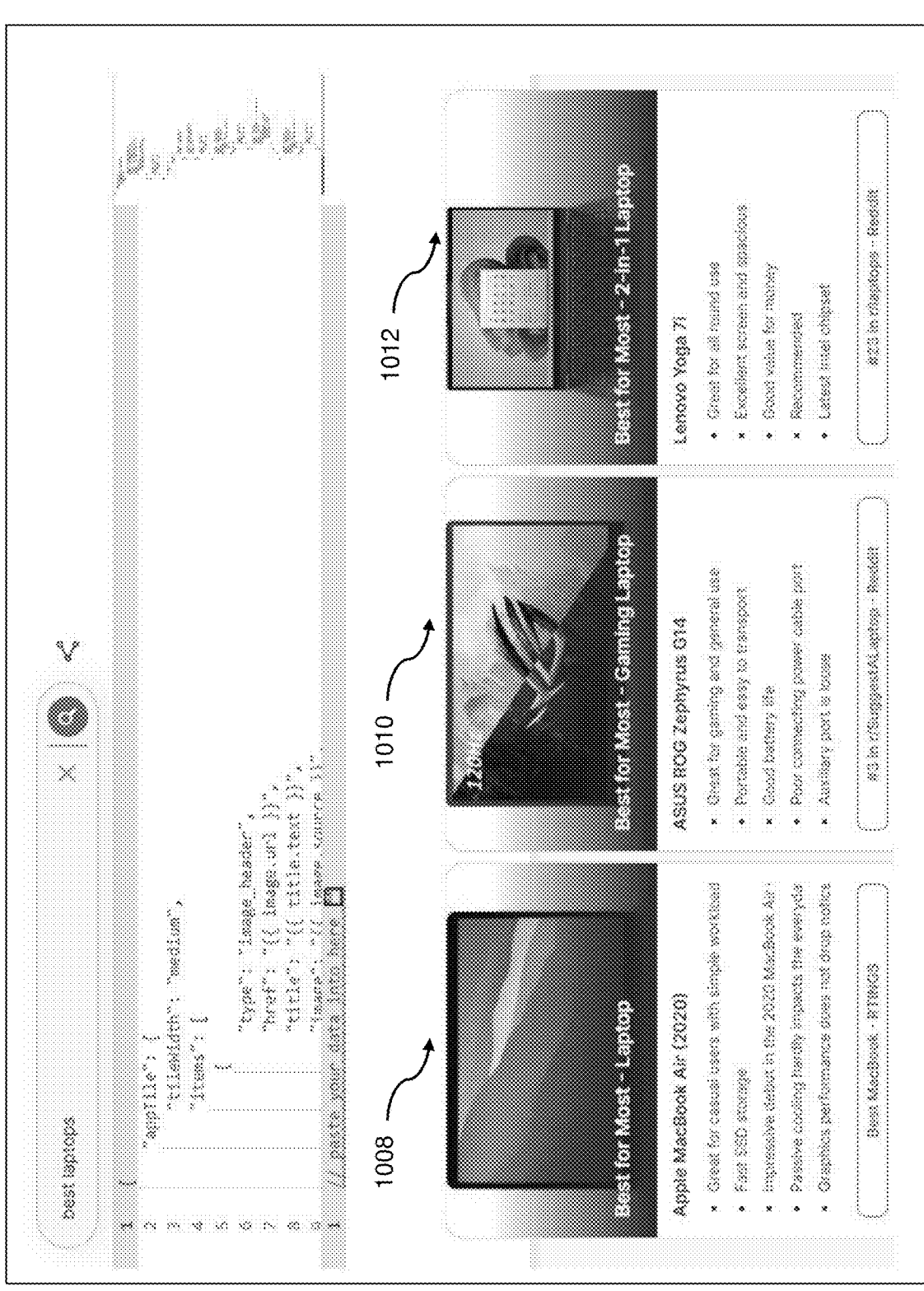

FIGS. 10A-10B provide example user interface (UI) diagrams illustrating a user at a search partner configuring customized presentation of search results, according to embodiments described herein. As shown in user interface 1002 in FIG. 10A, for example, a user (such as a developer at a data source server, an owner of a data source, etc.) may receive a programmable search interface development toolkit in the form of a code segment 1004, for the user to insert customized configuration data and/or code 1006 to configure data source desired display format of search results. The developer at the data source may use an interface 1002 to select elements, write code, or otherwise provide input to interface with an API for a data source to incorporate specific data or other functionality into the search application associated with the data source.

As shown in user interface in FIG. 10B, for example, the developer at the data source server may be presented with both a configuration interface (e.g., as shown in FIG. 10A) as well as an exemplary interface to preview changes made to the customized display format. For example, the developer may view different styles and/or formats 1008, 1010 and 1012 by making changes to the code segment 1004, and enter a testing query "best laptops."

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A method for a customized presentation of search results from a specific data source in an Internet search, the method comprising:

transmitting, via a first application programming interface (API) at the search server to a first data source server at which a search is to be performed, a search query;

integrating, into the first API at the search server, a programmable search interface development toolkit for building a customized display format that is configured by a data owner of the first data source server, for displaying search results from the first data source server;

receiving data-owner-configured display parameters configured by the data owner of the first data source server, from the first data source server and through the programmable search interface development toolkit integrated within the first API at the search server; and in response to receiving via the first API at the search server a first set of search results from the first data source server in the Internet search, building a first user-engageable panel of the customized display format based on the data-owner-configured display parameters reflecting a preference of the data owner, and causing a display of the first set of search results within the first user-engageable panel according to the customized display format.

2. The method of claim 1, wherein the programmable search interface development toolkit takes a form of a user interface application or a code program to be integrated into the first API.

3. The method of claim 2, wherein the data-owner-configured display parameters are received via one or more of:

a selection of display elements for display on the user interface application;

an input of a code segment; and a display file.

4. The method of claim 1, further comprising:

generating, at the search server, a search application that incorporates the first API for the first data source server using the programmable search interface development toolkit embedded with the data-owner-configured display parameters.

5. The method of claim 4, wherein the search application is generated further based on a type of the first data source server.

6. The method of claim 4, wherein the search application generates and transmits display data representing the customized display format for displaying the first set of search results to a user device.

7. The method of claim 1, further comprising:

receiving at the search server a second set of search results from a second data source server in the Internet search; and causing a display of the first set of search results within a first user-engageable panel and the second set of search results within a second user-engageable panel, wherein the first user engageable panel has a first format corresponding to a first type of the first data source server, and the second user engageable panel has a second format corresponding to a second type of the second data source server.

8. The method of claim 1, further comprising:

receiving a modification to the data-owner-configured display parameters through the programmable search interface development toolkit; and causing an updated display of the first set of search results within the first user-engageable panel according to an updated display format that is updated by the modification to the data-owner-configured display parameters in real time.

9. The method of claim 1, further comprising:

receiving, at the search server and from the first data source server, a request for registration as a search source; and establishing, at the search server, the first API to access the first data source server.

10. A system for a customized presentation of search results from a specific data source in an Internet search, the system comprising:

a communication interface that transmits, via a first application programming interface (API) at the search server to a first data source server at which a search is to be performed, a search query, integrate, into the first API at the search server, a programmable search interface development toolkit for building a customized display format that is configured by a data owner of the first data source server, for displaying search results from the first data source server, and receive data-owner-configured display parameters configured by the data owner of the first data source server, from the first data source server and through the programmable search interface development toolkit integrated within the first API at the search server;

a memory storing a plurality of processor-executable instructions; and a processor executing the plurality of processor-executable instructions to perform operations comprising:

in response to receiving via the first API at the search server a first set of search results from the first data source server in the Internet search, building a first user-engageable panel of the customized display format based on the data-owner-configured display parameters reflecting a preference of the data owner, and causing a display of the first set of search results within the first user-engageable panel according to the customized display format.

11. The system of claim 10, wherein the programmable search interface development toolkit takes a form of a user interface application or a code program to be integrated into the first API.

12. The system of claim 11, wherein the data-owner-configured display parameters are received via one or more of:
   a selection of display elements for display on the user interface application;
   an input of a code segment; and
   a display file.

13. The system of claim 10, wherein the operations further comprise:
   receiving at the search server a second set of search results from a second data source server in the Internet search; and
   causing a display of the first set of search results within a first user-engageable panel and the second set of search results within a second user-engageable panel,
   wherein the first user engageable panel has a first format corresponding to a first type of the first data source server, and the second user engageable panel has a second format corresponding to a second type of the second data source server.

14. The system of claim 10, wherein the operations further comprise:
   receiving a modification to the data-owner-configured display parameters through the programmable search interface development toolkit; and
   causing an updated display of the first set of search results within the first user-engageable panel according to an updated display format that is updated by the modification to the data-owner-configured display parameters in real time.

15. The system of claim 10, wherein the operations further comprise:
   receiving, at the search server and from the first data source server, a request for registration as a search source; and establishing, at the search server, the first API to access the first data source server.

16. A non-transitory computer-readable medium storing a plurality of computer-executable instructions for a customized presentation of search results from a specific data source in an Internet search, the instructions executed by one or more processors to perform operations comprising:
   transmitting, via a first application programming interface (API) at the search server to a first data source server at which a search is to be performed, a search query;
   integrating, into the first API at the search server, a programmable search interface development toolkit for building a customized display format that is configured by a data owner of the first data source server, for displaying search results from the first data source server;
   receiving data-owner-configured display parameters configured by the data owner of the first data source server, from the first data source server and through the programmable search interface development toolkit integrated within the first API at the search server; and
   in response to receiving via the first API at the search server a first set of search results from the first data source server in the Internet search, building a first user-engageable panel of the customized display format based on the data-owner-configured display parameters reflecting a preference of the data owner, and causing a display of the first set of search results within the first user-engageable panel according to the customized display format.

17. The medium of claim 16, wherein the programmable search interface development toolkit takes a form of a user interface application or a code program to be integrated into the first API.

18. The medium of claim 17, wherein the data-owner-configured display parameters are received via one or more of:
   a selection of display elements for display on the user interface application;
   an input of a code segment; and
   a display file.

* * * * *